(12) United States Patent
Mineta et al.

(10) Patent No.: US 9,826,431 B2
(45) Date of Patent: Nov. 21, 2017

(54) WEIGHTED RANDOM SELECTION OF TRANSMISSION RESOURCES BASED ON DEVICE POSITION

(71) Applicant: Mitsubishi Electric Corporation, Chiyoda-ku (JP)

(72) Inventors: Nobuyuki Mineta, Chiyoda-ku (JP); Hiroyuki Sato, Chiyoda-ku (JP); Seiya Inoue, Chiyoda-ku (JP); Takehisa Kimura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 162 days.

(21) Appl. No.: 14/436,728

(22) PCT Filed: Sep. 4, 2013

(86) PCT No.: PCT/JP2013/073767
§ 371 (c)(1),
(2) Date: Apr. 17, 2015

(87) PCT Pub. No.: WO2014/061361
PCT Pub. Date: Apr. 24, 2014

(65) Prior Publication Data
US 2015/0289163 A1    Oct. 8, 2015

(30) Foreign Application Priority Data
Oct. 18, 2012  (JP) .................. 2012-231053

(51) Int. Cl.
*H04W 28/04* (2009.01)
*H04B 1/707* (2011.01)
(Continued)

(52) U.S. Cl.
CPC .......... *H04W 28/044* (2013.01); *H04B 1/707* (2013.01); *H04B 7/1851* (2013.01);
(Continued)

(58) Field of Classification Search
CPC ... H04B 7/1851; H04B 7/216; H04W 28/044; H04W 4/02; H04W 72/0446; H04W 72/0453; H04W 84/06
See application file for complete search history.

(56) References Cited

U.S. PATENT DOCUMENTS 5,805,581 A * 9/1998 Uchida .............. H04B 7/18532
    370/335
6,014,562 A * 1/2000 Weiss .................. H04W 74/002
    370/337
(Continued)

FOREIGN PATENT DOCUMENTS

CN    1192300 A    9/1998
CN    1401197 A    3/2003
(Continued)

OTHER PUBLICATIONS

Japanese Office Action dated Aug. 30, 2016 in Patent Application No. 2013-012395 (with English Translation).
(Continued)

*Primary Examiner* — Ricky Ngo
*Assistant Examiner* — Stephen Steiner
(74) *Attorney, Agent, or Firm* — Oblon, McClelland, Maier & Neustadt, L.L.P.

(57) ABSTRACT

A transmission method including: a spreading code channel selection for selecting randomly a spreading code channel for CDMA spreading of transmission data, a time slot channel selection for selecting randomly a time slot channel for transmitting the CDMA-spread transmission data, a frequency channel selection for selecting randomly a frequency channel for transmitting the CMDA-spread transmission data, and a transmission for transmitting the transmission data CDMA-spread in the spreading code channel selected in the spreading code channel selection, using the time slot channel selected in the time slot channel selection,
(Continued)

at a frequency corresponding to the frequency channel selected in the frequency channel selection.

19 Claims, 24 Drawing Sheets

(51) Int. Cl.
| | | |
|---|---|---|
| H04B 7/185 | (2006.01) | |
| H04B 7/216 | (2006.01) | |
| H04W 4/02 | (2009.01) | |
| H04W 72/04 | (2009.01) | |
| H04J 13/00 | (2011.01) | |
| H04J 13/16 | (2011.01) | |
| H04W 84/06 | (2009.01) | |

(52) U.S. Cl.
CPC .......... *H04B 7/216* (2013.01); *H04J 13/0003* (2013.01); *H04J 13/0048* (2013.01); *H04J 13/16* (2013.01); *H04W 4/02* (2013.01); *H04W 72/042* (2013.01); *H04J 2013/0085* (2013.01); *H04W 72/0446* (2013.01); *H04W 72/0453* (2013.01); *H04W 84/06* (2013.01)

(56) References Cited

U.S. PATENT DOCUMENTS

| | | |
|---|---|---|
| 2003/0076812 A1 | 4/2003 | Benedittis |
| 2006/0050625 A1* | 3/2006 | Krasner .............. G01S 1/04 370/208 |
| 2007/0195730 A1 | 8/2007 | Cheng et al. |
| 2007/0248060 A1 | 10/2007 | Mooney et al. |
| 2009/0274105 A1 | 11/2009 | Choi et al. |
| 2011/0243109 A1 | 10/2011 | Cheng et al. |

FOREIGN PATENT DOCUMENTS

| | | |
|---|---|---|
| CN | 1926908 A | 3/2007 |
| CN | 101640936 A | 2/2010 |
| EP | 2 114 031 | 11/2009 |
| JP | 56-32853 A | 4/1981 |
| JP | 7-183828 A | 7/1995 |
| JP | 2001-169360 A | 6/2001 |
| JP | 2002-57613 A | 2/2002 |
| JP | 2004 289717 | 10/2004 |
| JP | 2009-534924 A | 9/2009 |
| JP | 2010 16801 | 1/2010 |
| JP | 2010 63049 | 3/2010 |
| JP | 2011 199886 | 10/2011 |
| KR | 10-2005-0088323 A | 9/2005 |
| WO | WO 96/39749 A1 | 12/1996 |
| WO | 2004 086653 | 10/2004 |
| WO | 2005 086520 | 9/2005 |
| WO | WO 2007/127092 A2 | 11/2007 |
| WO | WO 2011/159207 A1 | 12/2011 |

OTHER PUBLICATIONS

Japanese Office Action dated Aug. 30, 2016 in Patent Application No. 2013-012396 (with English Translation).

Japanese Office Action dated Nov. 20, 2013 in Japanese Patent Application No. 2012-231053 Filed Oct. 18, 2012 (with English translation).

Habuchi, H., "Pseudo-Noise Sequences Based on M-sequence and Its Application for Communications", Fundamentals Review, vol. 3, No. 1, (2009), pp. 32-42.

Kameda, S., et al., "Feasibility Study on Wireless Access for Location and Short Message Communication System Using QZSS", The Institute of Electronics, Information and Communication Engineers, (2012), pp. 35-40.

International Search Report dated Dec. 3, 2013 in PCT/JP2013/073767 Filed Sep. 4, 2013.

Combined Office Action and Search Report dated Feb. 3, 2016 in Chinese Patent Application No. 201380054425.4 with partial English translation and English translation of category of cited documents.

Office Action dated Jan. 21, 2016 in Korean Patent Application No. 10-2015-7009924 (with English language translation).

Extended European Search Report dated May 17, 2016 in Patent Application No. 13846781.6.

"E-UTRA Non-synchronized Random Access Procedure" Ericsson, TSG-RAN WG1 LTE Ad-Hoc, R1-061867, vol. RAN WG1 , XP050951274, Jun. 20, 2006, 4 Pages.

"RACH Design Issues of Large Cell Deployment" LG Electronics, 3GPP TSG RAN WG1 Meeting #46bis, R1-062557, vol. RAN WG1, XP050103074, Oct. 4, 2006, 6 Pages.

* cited by examiner

FIG.7A

| Selection number | Spreading code channel | Frequency channel | Time slot channel |
|---|---|---|---|
| 001 | channel #1 | channel #1 | channel #1 |
| 002 | channel #2 | channel #2 | channel #2 |
| 003 | channel #3 | channel #3 | channel #3 |
| 004 | channel #4 | channel #4 | channel #4 |
| ... | ... | ... | ... |
| NNN | channel #MMM | channel #LLL | channel #KKK |

FIG.7B

| Selection number | Spreading code channel | Frequency channel | Time slot channel |
|---|---|---|---|
| 001 | channel #1 | channel #1 | channel #1 |
| 002 | channel #1 | channel #1 | channel #2 |
| 003 | channel #1 | channel #2 | channel #1 |
| 004 | channel #1 | channel #2 | channel #2 |
| ... | ... | ... | ... |
| NNN-1 | channel #MMM | channel #LLL | channel #KKK |
| NNN | channel #MMM | channel #LLL | channel #KKK |

FIG.7C

| Selection number | Spreading code channel | Frequency channel | Time slot channel |
|---|---|---|---|
| 001 | channel #1 | channel #1 | channel #4 |
| 002 | channel #1 | channel #1 | channel #3 |
| 003 | channel #1 | channel #2 | channel #4 |
| 004 | channel #1 | channel #2 | channel #3 |
| ... | ... | ... | ... |
| NNN-1 | channel #MMM | channel #LLL | channel #4 |
| NNN | channel #MMM | channel #LLL | channel #3 |

PREDETERMINED REGION E

PREDETERMINED REGION E

PREDETERMINED REGION E

PREDETERMINED REGION E

FIG.18A

| Selection number | Spreading code channel | Frequency channel |
|---|---|---|
| 001 | channel #1 | channel #1 |
| 002 | channel #1 | channel #2 |
| 003 | channel #2 | channel #1 |
| 004 | channel #2 | channel #2 |
| ... | ... | ... |
| NNN | channel #MMM | channel #LLL |

FIG.18B

| Selection number | Time slot channel |
|---|---|
| 001 | channel #1 |
| 002 | channel #2 |
| 003 | channel #3 |
| 004 | channel #4 |
| ... | ... |
| NNN | channel #KKK |

FIG.18C

| Selection number | Time slot channel |
|---|---|
| 001 | channel #1 |
| 002 | channel #2 |
| 003 | channel #1 |
| 004 | channel #2 |
| ... | ... |
| NNN-1 | channel #1 |
| NNN | channel #2 |

FIG.18D

| Selection number | Time slot channel |
|---|---|
| 001 | channel #4 |
| 002 | channel #3 |
| 003 | channel #4 |
| 004 | channel #3 |
| ... | ... |
| NNN-1 | channel #4 |
| NNN | channel #3 |

FIG.19A

| Selection number | Spreading code channel | Frequency channel |
|---|---|---|
| 001 | channel #1 | channel #1 |
| 002 | channel #1 | channel #2 |
| 003 | channel #2 | channel #1 |
| 004 | channel #2 | channel #2 |
| ... | ... | ... |
| NNN | channel #MMM | channel #LLL |

FIG.19B

| Selection number | Time slot channel |
|---|---|
| 001 | channel #1 |
| 002 | channel #2 |
| 003 | channel #3 |
| 004 | channel #4 |
| ... | ... |
| NNN | channel #KKK |

FIG.19C

| Selection number | Time slot channel |
|---|---|
| 001 | channel #1 |
| 002 | channel #2 |

FIG.19D

| Selection number | Time slot channel |
|---|---|
| 001 | channel #4 |
| 002 | channel #3 |

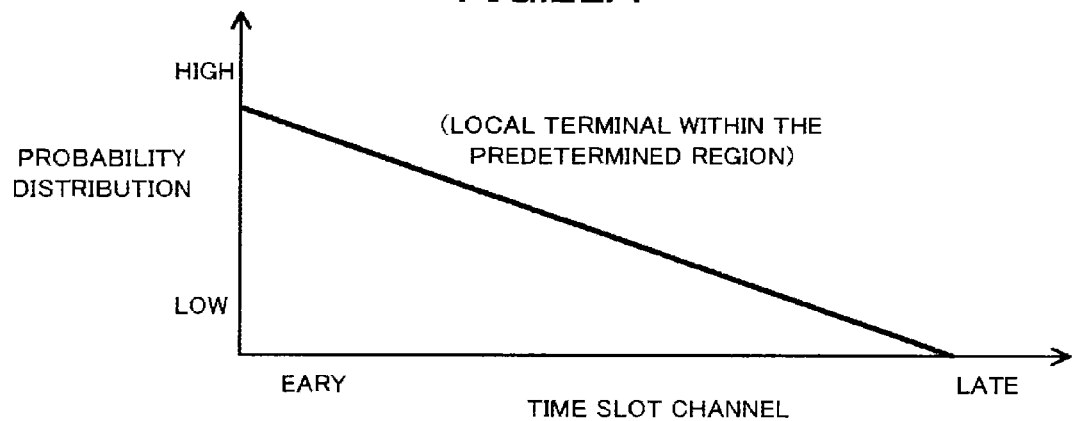
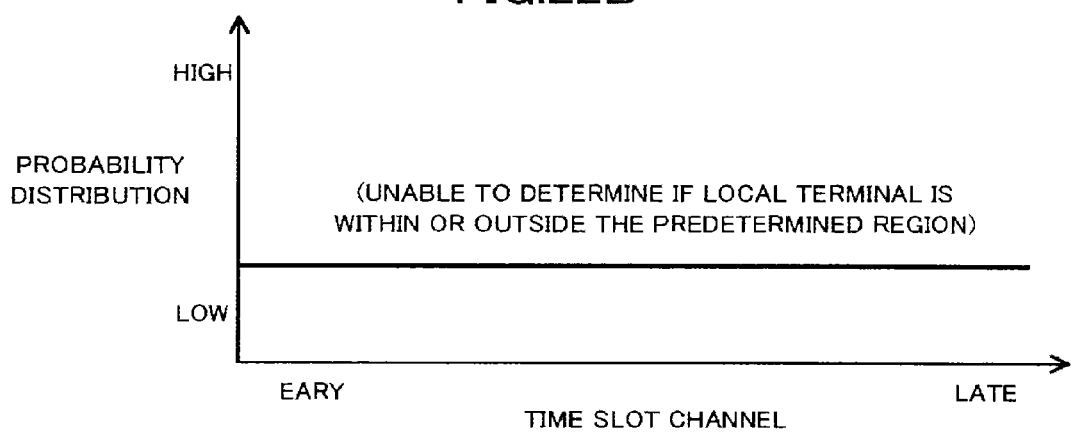
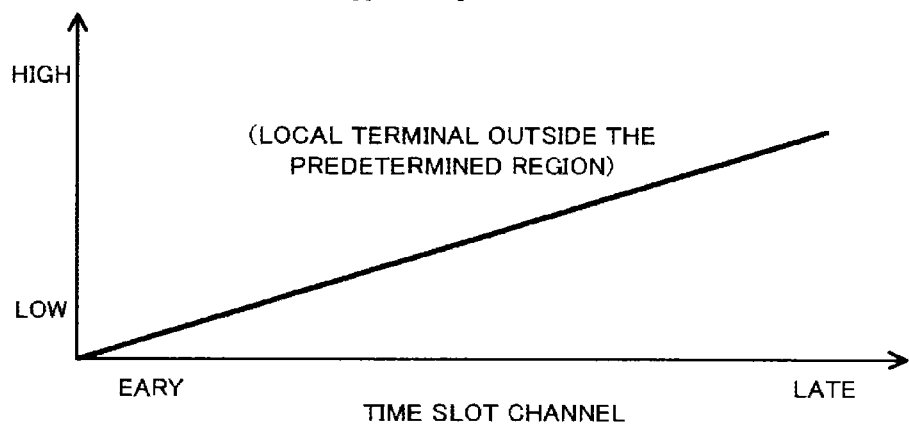

WEIGHTED RANDOM SELECTION OF TRANSMISSION RESOURCES BASED ON DEVICE POSITION

TECHNICAL FIELD

The present disclosure relates to a communication method, communication terminal, base station and communication system.

BACKGROUND ART

A combination of the Slotted-ALOHA method and the Code Division Multiple Access (CDMA) method is known as a satellite communication access method used in a wireless communication system for performing communication between a base station and a plurality of communication terminals.

According to this satellite communication method, the transmission-side communication terminal synchronizes transmission data spread using an individually allocated spreading code with slots on the time axis and transmits at predetermined slot intervals, and the receiving-side base station uses the same spreading code as that of the transmission-side to despread the received data and to extract the required data.

By combination of these two access methods, even if the plurality of communication terminals transmits packets using the same slot, if the spreading codes are different, the base station is able to extract data from the received signal. Thus decrease is possible of the incidence of the occurrence of a state in which the base station is unable to extract data from the received signal due to collision of packets transmitted from the plurality of communication terminals.

However, when the plurality of communication terminals uses the same spreading code and packets are sent using the same slot, packet collision still occurs, and the extraction of data from each packet becomes impossible.

Patent Literature 1 discloses technology by which, in order to decrease the occurrence of packet collision, a base station sends delay time information to each terminal, and each communication terminal adjusts the timing of transmission based on the delay time information acquired from the base station.

CITATION LIST

Patent Literature

Patent Literature 1: Unexamined Japanese Patent Application Kokai Publication No. 2004-289717

SUMMARY OF INVENTION

Technical Problem

According to the access method disclosed in Patent Literature 1, a transmission resource, which can be selected (adjusted), is limited by the delay time of transmission data. Therefore the collision of transmitted data of the plurality of communication terminals becomes unavoidable when the number of accessing communication terminals is increased. Therefore when the number of communication terminals increases, the frequency of retransmissions increases, and throughput decreases.

When a large-scale disaster occurs, numerous disaster sufferers are anticipated to transmit distress messages almost at the same time from their own communication terminals. However, according to the conventional satellite transmission access method, as explained above, increasing the throughput of transmissions is difficult.

The present disclosure is developed to solve the aforementioned problem, and the objective of the present disclosure is to provide a communication method, communication terminal, base station and communication system that can communicate in high throughput between communication terminals and a base station via a satellite.

Moreover, another objective of the present disclosure is to make possible the transmission of distress messages by a plurality of disaster sufferers when a disaster occurs.

Solution to Problem

In order to achieve the aforementioned objectives, the communication method of the present disclosure is a communication method used by a communication terminal for sending by satellite to a base station CDMA-spread transmission data, including the steps of: selecting randomly a spreading code channel for the CDMA spreading of transmission data; selecting randomly a time slot channel for transmitting the CDMA-spread transmission data; selecting randomly a frequency channel for transmitting the CDMA-spread transmission data; and transmitting the transmission data CDMA-spread in the spreading code channel selected in the spreading code channel selection step, using the time slot channel selected in the time slot channel selection step, at a frequency corresponding to the frequency channel selected in the frequency channel selection step.

Advantageous Effects of Invention

According to the present disclosure, collision of data transmitted simultaneously by the plurality of communication terminals is suppressed, the probability of successful transmission is increased so that throughput increases, and congestion of a communication line is prevented.

BRIEF DESCRIPTION OF DRAWINGS

FIG. 7A is a table stored in table storage, and used in usual cases for reference in order to select a combination of access methods, by the communication terminals according to the first, second, and fifth embodiments of the present disclosure;

FIG. 7B is a table stored in table storage, referenced for selecting a combination of access methods having a relatively early time slot channel, by the communication terminals according to the first, second, and fifth embodiments of the present disclosure;

FIG. 7C is a table stored in table storage, referenced for selecting a combination of access methods having a relatively late time slot channel, by the communication terminals according to the first, second, and fifth embodiments of the present disclosure;

FIG. 18A is a table stored in table storage, and used in usual cases for reference in order to select a combination of access methods, by the communication terminal according to the fourth embodiment of the present disclosure;

FIG. 18B is a table stored in table storage, recording all selectable time slot channels, and referenced for selecting a combination of access methods, by the communication terminal according to the fourth embodiment of the present disclosure;

FIG. 18C is a table stored in table storage, recording time slots channels that are relatively early, and referenced for selecting a combination of access methods, by the communication terminal according to the fourth embodiment of the present disclosure;

FIG. 18D is a table stored in table storage, recording time slots channels that are relatively late, and referenced for selecting a combination of access methods, by the communication terminal according to the fourth embodiment of the present disclosure;

FIG. 19A is a table stored in table storage, and used in usual cases for reference in order to select a combination of access methods, by the communication terminal according to the modified examples of the fourth embodiment of the present disclosure;

FIG. 19B is a table stored in table storage, recording all selectable time slot channels, and referenced for selecting a combination of access methods, by the communication terminal according to the modified example of the fourth embodiment of the present disclosure;

FIG. 19C is a table stored in table storage, recording only selectable time slot channels that are relatively early, and referenced for selecting a combination of access methods, by the communication terminal according to the modified example of the fourth embodiment of the present disclosure;

FIG. 19D is a table stored in table storage, recording only selectable time slots channels being relatively late, and referenced for selecting a combination of access methods, by the communication terminal according to the modified example of the fourth embodiment of the present disclosure;

FIG. 22A is a graph showing probability distribution set by the probability setter of the communication terminal according to the fifth embodiment of the present disclosure, showing the case in which the local terminal is within the predetermined region;

FIG. 22B is a graph showing probability distribution set by the probability setter of the communication terminal according to the fifth embodiment of the present disclosure, showing the case in which determination is impossible of whether the local terminal is inside or outside of the predetermined region;

FIG. 22C is a graph showing probability distribution set by the probability setter of the communication terminal according to the fifth embodiment of the present disclosure, showing the case in which the local terminal is outside of the predetermined region;

DESCRIPTION OF EMBODIMENTS

According to a conventional random access method such as slotted-ALOHA, a communication terminal starts transmission of transmission data, using a specific slot interval, synchronized with a slot on the time axis. A synchronization signal is also required to be used in order to match timing of the transmission with the time slot, and this synchronization signal is transmitted from the base station to all of the communication terminals. However, the slotted-ALOHA method cannot be adopted by the communication system of the embodiment of the present disclosure, because slotted-ALOHA method would bring about transmission delays, for example, due to transmission data collision caused by simultaneous transmissions of distress messages from numerous communication terminals receiving a disaster service initiation signal from a base station when a large scale disaster occurs. Thus according to the below described embodiment, a random access method is proposed that combines Code Division Multiple Access (CDMA), Frequency Division Multiple Access (FDMA) and Time Division Multiple Access (TDMA).

First Embodiment

A first embodiment of the present disclosure is explained below in reference to FIGS. 1 to 7. In the figures, parts indicated by the same reference sign are identical or corresponding parts, and detailed description of such parts is omitted.

The first embodiment of the present disclosure relates to: (1) a communication system for performing communication between a base station and communication terminals via a satellite; (2) the communication terminals for transmitting via the satellite to the base station, by transmitting CDMA-spread transmission data as a return line signal; (3) the base station for performing communication with the communication terminals via the satellite; and (4) a communication method using the communication terminals for transmission to the base station via the satellite using CDMA-spread transmission data.

Figure 1:
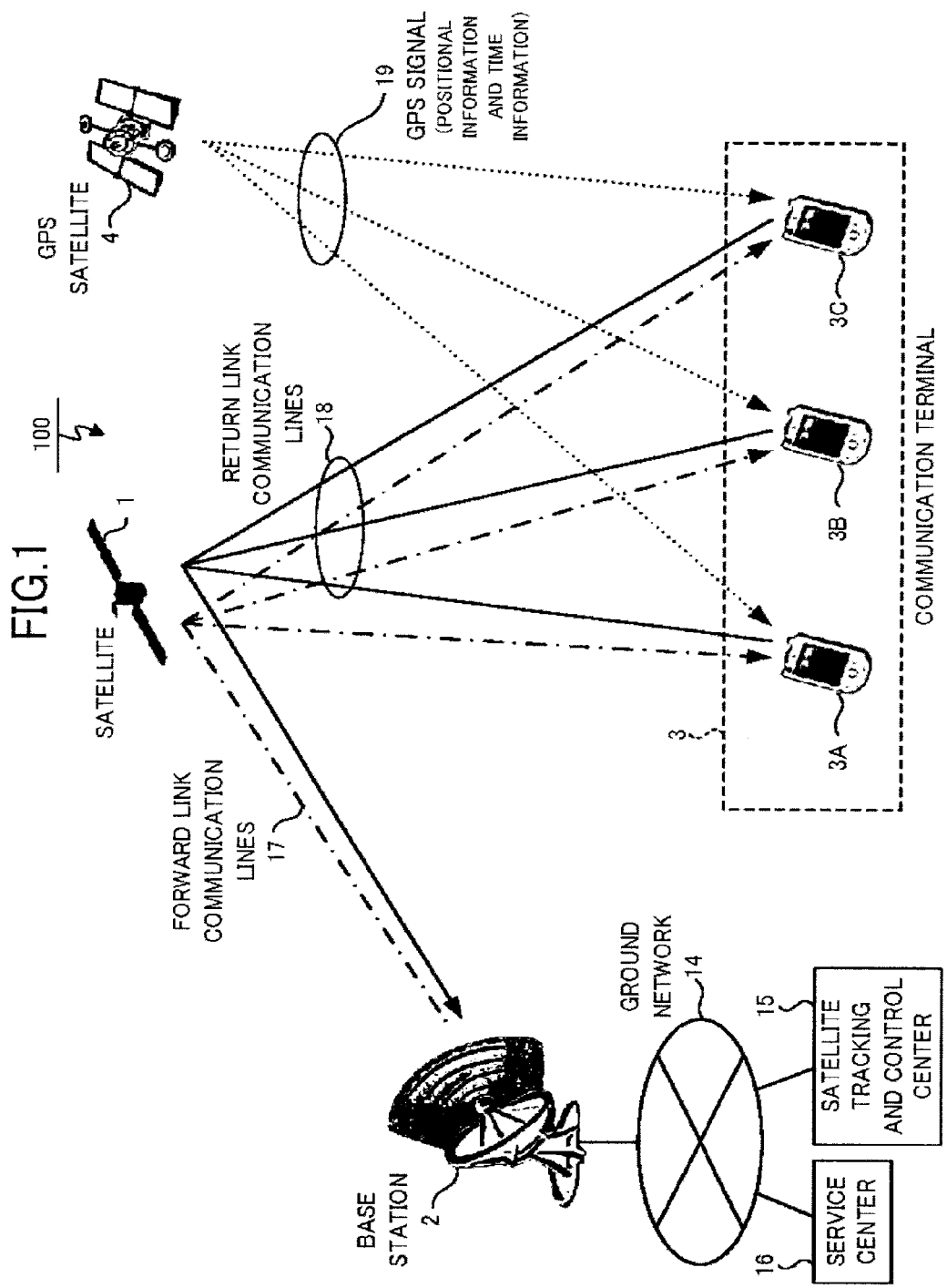
FIG. 1 is a schematic drawing of a communication system (communication terminal, base station and satellite) according to a first embodiment of the present disclosure.

Firstly, the communication system of the first embodiment is explained in reference to FIG. 1. As shown in FIG. 1, the communication system 100 of the present embodiment includes a plurality of satellites 1, a base station 2, communication terminals and a plurality of Global Positioning System (GPS) satellites 4. However, a single satellite 1 and a single GPS satellite 4 are illustrated in FIG. 1.

The plurality of satellites 1 are configured as satellites 1 relaying wireless signals between the base station 2 and communication terminals 3. Each of the satellites 1 is a quasi-zenith satellite that follows a predetermined orbit. At least one of the satellites 1 is present in the sky above a specific region.

The base station 2 performs wireless communication via the satellite 1 with the communication terminals 3. More specifically, the base station 2 uses forward link communication lines 17 to broadcast the forward link signal though the satellite 1 to the communication terminals 3. The base station 2 receives return link signals transmitted from the communication terminals 3 using return link communication lines 18 via the satellite 1.

Through a ground network 14, the base station 2 is connected to a satellite tracking and control center 15 and a service center 16. The ground network 14, for example, is a communication network for data transfer based on a protocol such as Transmission Control Protocol/Internet Protocol (TCP/IP). Through the ground network 14, the satellite tracking and control center 15 transmits and receives satellite tracking information with the base station 2 for tracking the satellite 1. Through the ground network 14, the service center 16 acquires various types of data received by the base station 2 and transmitted from the communication terminals 3, and sends to the base station 2 various types of data to be delivered to the communication terminals 3.

Through the satellite 1, the communication terminals 3 perform wireless communication with the base station 2. The communication terminals 3 include a communication terminal 3A, a communication terminal 3B and a communication terminal 3C. The communication terminals 3A to 3C may be referred collectively as communication terminals 3 and any single terminal among the communication terminals 3A to 3C may be referred as the communication terminal 3 in the followings. Furthermore, the number of the communication terminals 3 is not limited to three.

The communication terminal 3 receives the forward link signal transmitted from the base station 2, and the received forward link signal acts as a trigger for the communication terminal 3 to transmit a return link signal to the base station 2. Each of the return link signals transmitted from the communication terminal 3A, communication terminal 3B and communication terminal 3C is transmitted to the satellite 1 using a mutually independent return link communication line 18, and these return link signals are combined by the satellite 1 and are transmitted to the base station 2.

A GPS signal 19 including positional information and time information is transmitted by the GPS satellite 4 to the communication terminals 3. The satellite 1 may have the functions of the GPS satellite 4.

The forward link communication lines 17 are communication paths for the base station 2 to transmit the forward link signals via the satellite 1 to the communication terminals 3. The return link communication lines 18 are communication paths for the communication terminals 3 to transmit the return link signals via the satellite 1 to the base station 2. The GPS signal 19 is transmitted from the GPS satellite 4 and is a signal that includes GPS information (positional information and time information) to be received by the communication terminals 3.

Figure 2:
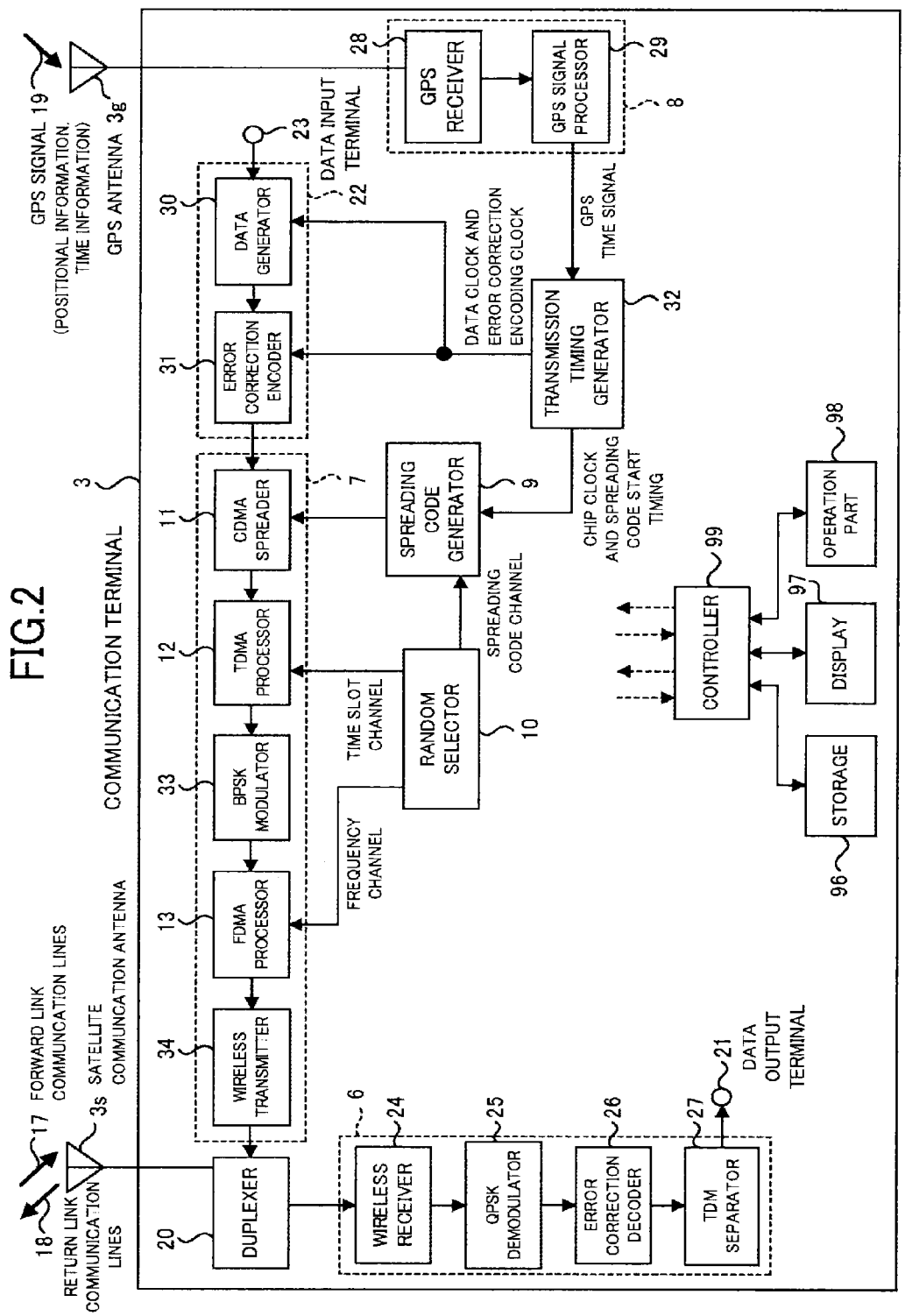
FIG. 2 is a block diagram explaining functions of the communication terminal according to the first embodiment of the present disclosure.

The configuration of functions of the communication terminal 3 is explained below in detail in reference to FIG. 2. As shown in FIG. 2, the communication terminal 3 includes a satellite communication antenna 3s (communication terminal-side satellite communication antenna), GPS antenna 3g, receiver 6, transmitter 7, information acquirer 8, spreading code generator 9, random selector 10, duplexer 20, data output terminal 21, transmission data processor 22, data input terminal 23, transmission timing generator 32, storage 96, display 97, operation part 98 and controller 99. Although the storage 96, display 97, operation part 98 and controller 99 are illustrated in FIG. 2, these components are not illustrated in the communication terminal 3 block diagrams of FIGS. 6, 8, 10, 16, 17, 20 and 21. In the communication terminal 3 shown in the aforementioned FIG. 6 and others, the controller 99 may function so as to control various constituent components, and the various constituent components may be configured to provide suitably the functions of the controller 99.

The satellite communication antenna 3s receives the forward link signal transmitted from the base station 2 via the forward link communication line 17. Moreover, the satellite communication antenna 3s transmits the return link signal to the base station 2 via the return link communication line 18.

The GPS antenna 3g receives the GPS signal 19 transmitted from the GPS satellite 4 and sends output to the information acquirer 8.

The receiver 6 includes a wireless receiver 24, QPSK demodulator 25, error correction decoder 26 and TDM separator 27. The receiver 6 demodulates the forward link signal 19 and outputs the demodulated signal.

The wireless receiver 24 performs low-noise amplification of the forward link signal supplied through the satellite communication antenna 3s and the duplexer 20, and provides the amplified signal to QPSK demodulator 25.

The QPSK demodulator 25 demodulates the QPSK modulated wave (baseband signal) of the forward link signal received from the wireless receiver 24, and supplies the resultant signal to the error correction decoder 26.

The error correction decoder 26 performs error-corrected decoding using the redundant bit added to the forward link signal and acquires the original information data.

The transmission data, which is communication data or control data multiplexed by Time Division Multiplexing (TDM), is separated on a time axis by the TDM separator 27, the TDM separator 27 acquires the received data addressed to the local terminal, and this received data is output to the received data output terminal 21.

The transmitter 7 includes a CDMA spreader 11, TDMA processor 12, BPSK modulator 33, FDMA processor 13 and wireless transmitter 34. The transmission data sent from the transmission data processor 22 is modulated by the transmitter 7, and is transmitted from the satellite communication antenna 3s through the duplexer 20.

The CDMA spreader 11 CDMA spreads the transmission data by multiplying the transmission data received from the transmission data processor 22 by the spreading code (orthogonal code) generated by the spreading code generator 9.

The TDMA processor 12 delays the transmission data CDMA spread by the CDMA spreader 11 based on the time slot of transmission of the transmission data.

Based on the transmission data output from the TDMA processor 12, the Binary Phase Shift Keying (BPSK) modulator 33 discretely changes phase of the carrier wave and converts the transmission data into an electrical signal suitable for transmission. That is to say, the transmission data is BPSK modulated.

The FDMA processor 13 performs frequency conversion of the transmission data signal output from the BPSK modulator 33.

The wireless transmitter 34 performs power amplification of the transmission data signal output from the FDMA processor 13, and through the duplexer 20, transmits the amplified transmission data signal from the satellite communication antenna 3s.

The information acquirer 8 includes a GPS receiver 28 and GPS signal processor 29, and receives the GPS signal 19 through the GPS antenna 3g.

Through the GPS antenna 3g, the GPS signal receiver 28 receives the GPS signal 19 from the GPS satellite 4.

The GPS signal processor 29 processes the GPS signal 19, decodes the positional information and time information, and sends the time information to the transmission timing generator 32.

The spreading code generator 9 generates a spreading code in response to the chip clock spreading code start timing output from the transmission timing generator 32.

The random selector 10 selects randomly a spreading code channel to be used by the spreading code generator 9 and notifies the spreading code generator 9 which spreading code channel is selected. The random selector 10 also selects randomly a time slot channel to be used by the TDMA processor 12 as the basis of the time for delaying transmission data, and then the random selector 10 notifies the TDMA processor 12 which time slot channel is selected. Furthermore, the random selector 10 selects randomly a frequency channel for the frequency conversion of the FDMA processor 13, and the random selector 10 notifies the FDMA processor 13 which frequency channel is selected.

The duplexer 20 supplies the signal received from the communication satellite through the satellite communication antenna 3s to the receiver 6, and supplies the transmission signal from the transmitter 7 to the satellite communication antenna 3s.

The transmission data processor 22 includes a data generator 30 and an error correction encoder 31. The transmission data processor 22 generates transmission data to which an error correction code is added, and supplies the error correction code-added transmission data to the CDMA spreader 11.

The data generator 30 generates data for transmission (transmission data) synchronized with a data clock signal supplied from the transmission timing generator 32.

In response to the error correcting code clock and data clock signals, the error correction encoder 31 adds, for example, a synchronization bit and control bit to the transmission data output from the data generator 30 and generates transmission data in burst format such that the transmissions are synchronized among the communication terminals 3. The error correction encoder 31 further adds a redundant bit and performs error correction encoding, and outputs the error correction-encoded transmission data to the CDMA spreader 11.

The storage 96 is composed of Read Only Memory (ROM) and Random Access Memory (RAM), and stores each type of data and each type of program.

The display 97 receives image information supplied from the controller 99. After processing, the display 97 converts the image information into a video signal using predetermined synchronization timing for display. The display 97 includes, for example, a liquid crystal display or organic Electro-Luminescence (EL) display. The display 97 may alternatively be a device that combines an input function and display function, such as a touch panel that has a touch switch function.

The operation part 98 receives various types of operations and instructions from the user of the communication terminal 3. The operation part 98 processes an input signal from the user, and outputs the processed input signal to the controller 99. The operation part 98 is composed, for example, of input buttons, a touch panel, or the like mounted on the communication terminal 3.

The controller 99 is composed, for example, of a Central Processing Unit (CPU), and performs processing as well as controls the operations of various parts. In particular, in the present embodiment, the controller 99, in response to the forward link signal output from the receiver 6 to the data output terminal 21, performs signal processing to generate transmission data, and supplies the transmission data to the transmission data processor 22 through the data input terminal 23. The controller 99 controls the operational timing of various parts. Furthermore, although the figures show the controller 99 configured as an independent component, the controller may alternatively be configured to include the function of another component. For example, the controller 99 may also perform functions of the spreading code generator 9, random selector 10, transmission data processor 22, and transmission timing generator 32.

The transmission of data from the communication terminal 3 via the satellite 1 to the base station 2 is explained below in reference to FIG. 2.

Upon the receiver 6 receiving the forward link signal from the satellite communication antenna 3s through the duplexer 20, the forward link signal is decoded, and the decoded forward link signal is output to the data output terminal 21. In response to the received forward link signal, the controller 99 generates data for transmission, and supplies the transmission data to the transmission data processor 22 through the data input terminal 23.

The data generator 30 of the transmission data processor 22 adds, for example, a synchronization bit and control bit to the data received from the data input terminal 23, converts the resultant data to a predetermined burst format, and supplies the converted data to the error correction encoder 31. The error correction encoder 31 performs error correction encoding of the transmission data received from the data generator 30.

The transmission data generated by the transmission data processor 22 is supplied to the CDMA spreader 11 of the transmitter 7.

The CDMA spreader 11 CDMA spreads the transmission data by multiplication of the transmission data by the spreading code (orthogonal code) generated by the spreading code generator 9. The TDMA processor 12 delays the CDMA-spread transmission data according to a time slot for transmission. The BPSK modulator 33 discretely changes the phase of the carrier wave according to the transmission data, and converts the transmission data into an electrical signal that is suitable for transmission. The FDMA processor 13 performs frequency conversion of the transmission data phase-modulated by the BPSK modulator 33. The wireless transmitter 34 amplifies the power of the transmission data signal acquired from the FDMA processor 13, and transmits the amplified transmission data signal to the base station 2 via the duplexer 20 and satellite communication antenna 3s.

To synchronize the spreading code start timing among the communication terminals 3 the transmission timing generator 32 generates a timing signal and clock signal synchronized with the time signal acquired from the GPS signal processor 29.

The data generator 30 and the error correction encoder 31 perform conversion of transmission data to data in a predetermined burst format to which a synchronization bit, control bit and/or the like are added so that communications are synchronized among the communication terminals 3 in response to the data clock signal output from the transmission timing generator 32 and an error correction encoding clock and perform error correction encoding by adding a redundant bit.

The transmission timing generator 32 generates transmission timing signals including such as chip clock signals used for generating the spreading code and a spreading code start timing signal to synchronize spreading code start timing among the communication terminals 3. The spreading code generator 9 selects randomly a single spreading code from among a plurality of (no.=L) spreading codes and generates the selected spreading code in response to the chip clock and spreading code start timing signal synchronized with the GPS time signal. Thus the chip clock and spreading code start timing of the spreading code of the CDMA signals to be transmitted from the communication terminals 3 to the satellite 1 can be synchronized among the communication terminals 3. Thus if the distances from the communication terminals 3 to the satellite 1 are almost the same, the chip clock and spreading code start timing of the spreading code of the CDMA signal transmitted by each of the communication terminals 3 become synchronous at the transponder of the satellite 1.

That is to say, the communication terminal 3 is equipped with an information acquirer 8 for acquiring GPS information from the GPS satellite 4, and based on the spreading code start timing generated by the transmission timing generator 32 from the time information included in the GPS information, the spreading code generator 9 generates the spreading code. Furthermore, rather than just selecting randomly and then supplying the spreading code used by the spreading code generator 9, the random selector 10 of the communication terminal 3 also selects randomly and then supplies the time slot channel used by the TDMA processor 12 as the basis of the time for delaying the transmission data, and the random selector 10 further selects randomly and then supplies the frequency channel for frequency conversion performed by the FDMA processor 13.

Based on the time slot channel acquired from the random selector 10, the CDMA-spread transmission data CDMA spread by the CDMA spreader 11 is time delayed by the TDMA processor 12 so as to be transmitted using the time slot acquired from the random selector 10. Thereafter, the transmission data is BPSK modulated by the BPSK modulator 33, and then is subjected to frequency conversion by the FDMA processor 13 to a frequency corresponding to the frequency channel input from the random selector 10. Thereafter, the frequency-converted transmission data signal, for example, is amplified by the wireless transmitter 34 and then is transmitted to the satellite 1 as a transmission burst signal (return link signal) through the duplexer 20 and from the satellite communication antenna 3s using the return link communication line 18.

According to the communication system of the first embodiment of the present disclosure, a combination of spreading code channel, time slot channel and frequency channel set randomly by the random selector 10 is used for each communication terminal 3. That is to say, a "combination of access methods" in random accessing using CDMA/FDMA/TDMA is used.

Figure 3:
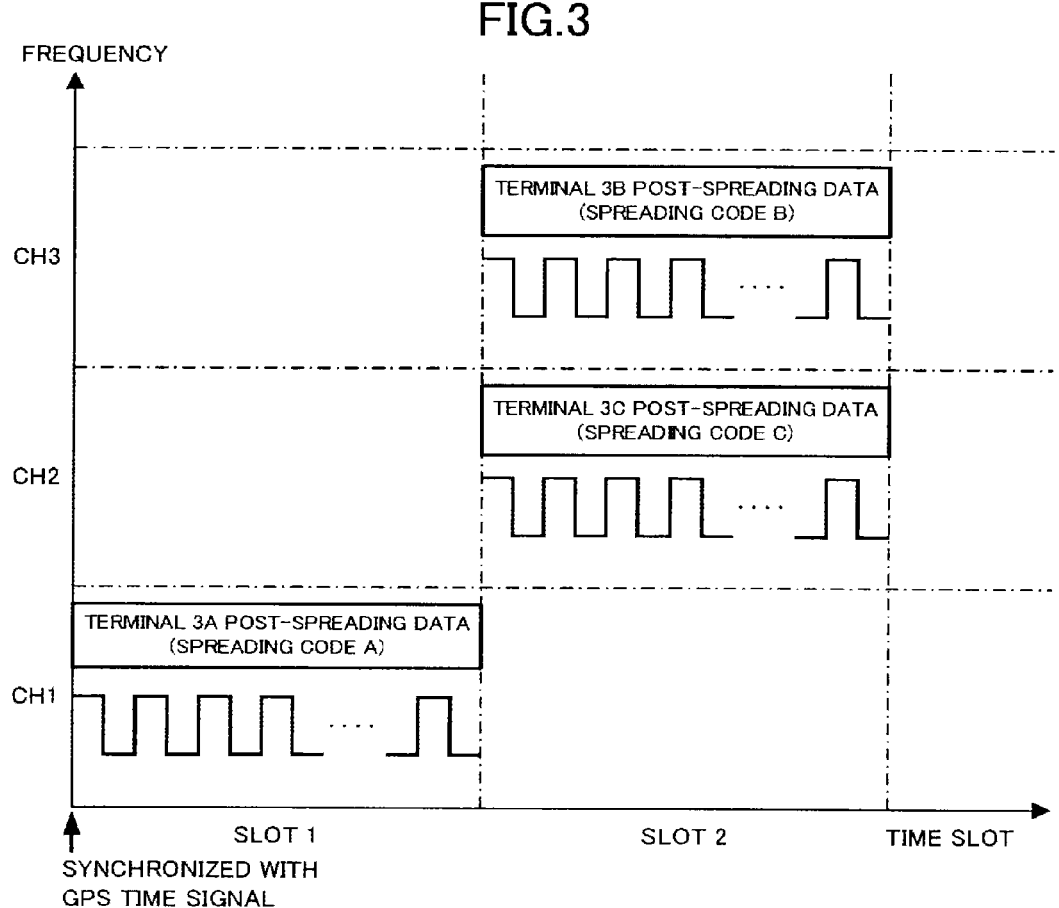
FIG. 3 is a drawing showing a combination of access methods of the communication terminal according to the first embodiment of the present disclosure.

FIG. 3 shows an example in which the communication terminal 3A selects the combination of spreading code A, frequency CH1 and time slot 1, communication terminal 3B selects the combination of spreading code B, frequency channel CH3 and time slot 2, and communication terminal 3C selects the combination of spreading code C, frequency CH2, and time slot 2. As shown in FIG. 3, spreading code chip timing and transmission timing of the time slot are synchronized with the GPS time signal.

Furthermore, according to the example shown in FIG. 3, because the combinations of access methods used by the communication terminals are different from one another, collision of transmission data at the satellite 1 does not occur.

In this manner, the communication terminal 3 of the first embodiment of the present disclosure determines the channels to be used in access to the satellite 1, that are a combination of access methods selected randomly by the random selector 10. Thus even when communication terminals 3 simultaneously access the satellite 1, the probability of collision of data transmitted by each of the communication terminals 3 is low. Furthermore, the probability of being unable to communicate is low, and the throughput is high. Furthermore, there is a low probability of the lines becoming congested such that communication becomes impossible between the communication terminals 3 and the base station 2. When such probabilities are low in this manner, the number of spreading code channels, the number of time slot channels and the number of selectable frequency channels by the random selector 10 is varied according to the number of simultaneously communicating communication terminals 3. Thus the number of spreading code channels, the number of time slot channels, and the number of frequency channels may each be set according to the desired "level of probability without coincidence of the combinations of access methods".

Due to the communication system 100 having the aforementioned characteristics, the communication terminals 3 are suitable for applications such as transmission via the satellite 1 to exchange mutually short messages such as safety information including individual identification information (ID information) and positional information. Such short messages may also be called "position short messages", and are referred to below as "short messages".

One example of a service using short messages is the receiving by the service center 16 of distress messages, including ID information and positional information, from communication terminals 3 when a disaster has occurred. The operation of each of the communication terminals 3 is explained in the case of such service.

In this case, the service center 16 commands the base station 2 to transmit the forward link signal to the communication terminals 3 of the disaster sufferers. In response to the command, the base station 2 transmits the forward link signal via the forward link communication lines 17 to the communication terminals 3 of the disaster sufferers.

The communication terminal 3 receives the forward link signal transmitted via the forward link communication lines 17 from the base station 2. The receiving of the forward link signal triggers the communication terminal 3 to transmit to the base station 2 via the return link communication lines 18 a return link signal (transmission signal) including, for example, the communication terminal 3 positional information, distress message, emergency message or disaster signal. The base station 2 receives the return link signal and transmits to the service center 16 via the ground network 14. The service center 16 receives the return link signal. By this means, the service center is able to acquire information about the disaster sufferers. Furthermore, the service center 16, after receiving a short message including disaster sufferer information, via the forward link communication lines 17, can transmit a reply message including an ACK signal to the communication terminal 3 that had transmitted the short message.

Figure 4:
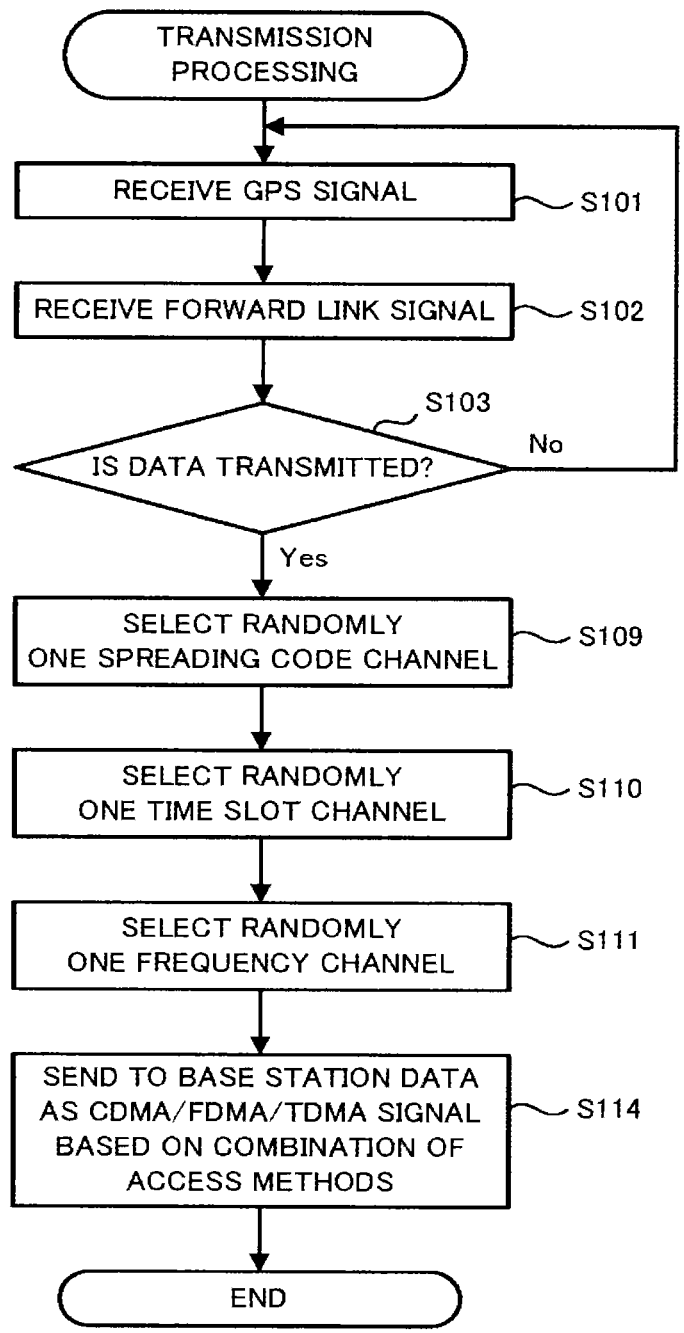
FIG. 4 is a flowchart showing transmission processing of the communication terminal according to the first embodiment of the present disclosure.
Figure 5:
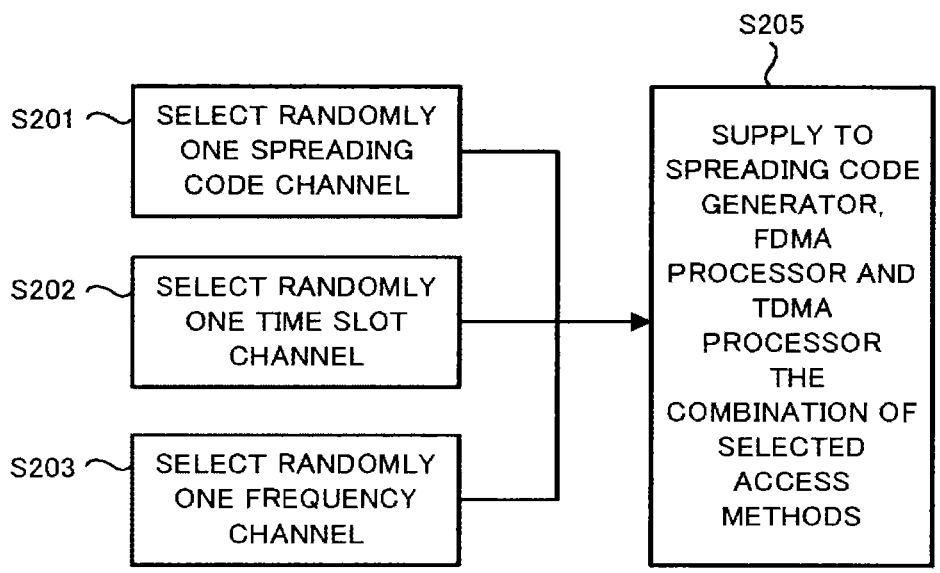
FIG. 5 is a flowchart showing processing to select the combination of access methods in the transmission processing of the communication terminal according to the first embodiment of the present disclosure.

The communication method of the first embodiment of the present description is explained while referencing FIGS. 4 and 5. FIG. 4 is a flowchart showing the transmission processing of the communication terminal 3. This transmission processing is the processing for the communication terminal 3 to transmit CDMA-spread transmission data to the base station 2 via the satellite 1.

As shown in FIG. 4, upon electrical power to the communication terminal 3 being turned ON, the information acquirer starts up, and the controller 99 receives the GPS signal 19 through the GPS antenna 3g (step S101). Furthermore, the controller 99 starts up the receiver 6 so that the controller 99 receives from the base station 2 the forward link signal through the satellite communication antenna 3s (step S102). Usually, the electrical power is supplied to the communication terminal 3. However, a configuration may also be used in which electrical power is turned ON to the communication terminal 3 as required.

The communication terminal 3 determines whether to transmit data or not (step S103). The determination of whether to transmit data or not is made, for example, in the below described manner. When a disaster occurs, the service center 16 starts a distress message service and transmits via the ground network 14 to the base station 2 control data notifying that the distress message service has started. This control data is referred to as the "rescue service initiation signal", and for non-distress service applications, may be simply referred to as the "service initiation signal". The base station 2 transmits the rescue service initiation signal to all communication terminals 3 as control data of the forward link signal.

In the aforementioned step S102, from the received data acquired from the TDM separator 27, the controller 99 determines whether the received forward link signal includes the distress message service initiation signal, i.e. service initiation signal. Upon determining that the distress message service initiation signal, i.e. service initiation signal, is included in the forward link signal, the controller 99 determines whether the distress message transmit button, i.e. input button, of the operation part 98 is pressed (step S103). When the controller 99 determines that the transmit button is pressed (result of step S103=YES), processing proceeds to step S109. However, upon determination that the transmit button is not pressed (result of step S103=NO), processing returns to step 101. Furthermore, rather than a physical button, the distress message transmit button may be a button displayed on a display 97 equipped with a touch panel, or may be a button displayed on a touch panel type display connected to the communication terminal 3. Furthermore, a configuration may be used in which the operation part 98 is equipped with a voice input part or a voice input device is connected to the communication terminal 3, and the transmission command is issued by voice input saying that the user would like to transmit a distress message. Such an input means is referred to generally as an "inputter".

When the controller 99 receives the distress message service initiation signal and determines that the distress message transmit button is pressed, the controller 99 makes a determination to transmit data (result of step S103=YES). The controller 99 also generates a short message such as safety information including the individual identification information, i.e. ID information, stored in the storage 96, and the positional information acquired by the information acquirer 8. The controller 99 then supplies the generated short message through the data input terminal 23 to the data processor 22. The transmission data processor 22 adds, for example, synchronization data to the supplied short message, further adds an error correcting code, and outputs the resultant data to the transmitter 7.

Furthermore, the controller 99 in step S103 may determine to transmit data in response to receiving the distress message service initiation signal, even without determination of whether the distress message transmit button is pressed. In this case, the providing of the communication terminal 3 with the distress message transmit button itself is optional.

The random selector 10 selects randomly one spreading code channel from among the L spreading code channels (step S109). This step may be said to be a spreading code channel selection step for random selection of the spreading code channel to be used for CDMA spreading of the transmission data. Thereafter, the random selector 10 selects randomly one time slot channel from among M time slot channels (step S110). This step may be said to be a time slot channel selection step for random selection of the time slot channel to be used for transmitting the CDMA-spread transmission data. Furthermore, the random selector 10 selects randomly one frequency channel from among N frequency channels (step S111). This step may be said to be a frequency channel selection step for random selection of the frequency channel to be used for transmitting the CDMA-spread transmission data.

The transmitter 7 receives the transmission data supplied from the transmission data processor 22 as a combination of randomly selected access methods selected by the random selector 10 and transmits the transmission data to the satellite 1 through the satellite communication antenna 3s as a CDMA/FDMA/TDMA signal (step S114). This step is a transmission step for transmitting the CDMA-spread transmission data using the selected spreading code selected at the spreading code selection step, at the frequency corresponding to the frequency channel selected at the frequency channel selection step, and at the time slot channel selected at the time slot channel selection step.

The series of processing of the flowchart of FIG. 4 may be said to be processing of a transmission step for the transmission to the base station 2 of the transmission data as a return link signal, triggered by the reception by the communication terminal 3 of the forward link signal transmitted from the base station 2 via the satellite 1.

The processing of steps S109 to S111 and S114 is processing for linking the random selector 10 and the transmitter 7 and transmitting the short message, for example, processed by the transmission data processor 22. Furthermore, the processing of step S114 also includes a synchronization step for synchronization by the transmission timing generator 32 to perform synchronous transmission of the CDMA-spread transmission data by the communication terminals 3.

Alternatively, the steps S109 to S111 and S114 are described as processing steps in the following manner.

Step S109 is a CDMA-spreading step using the CDMA spreader 11 to CDMA spread the transmission data using the spreading code randomly selected in the spreading code channel selection step.

Step S110 is a delay step, using the TDMA processor 12, to cause delay of transmission of the CDMA-spread transmission data spread at the CDMA-spreading step, using the time slot channel randomly selected by the time slot channel selection step.

Step S111 is a frequency conversion step, using the FDMA processor 13, for frequency conversion of the transmission data, time-delayed in the delay step, to the frequency corresponding to the frequency channel randomly selected at the frequency channel selection step.

Step S114 is a transmission step, using the wireless transmitter 34, for transmitting the transmission data CDMA spread by the CDMA-spreading step, delayed by the delay step, and frequency converted by the frequency conversion step.

FIG. 5 is a flowchart showing the preprocessing of the transmission processing of the communication terminal 3 of the first embodiment.

Step S201 corresponds to step S109 shown in FIG. 4 and is the spreading code channel selection step in which the random selector 10 selects randomly the spreading code for CDMA spreading of the transition data. Step S202 corresponds to step S110 shown in FIG. 4 and is the time slot channel selection step in which the random selector 10 selects randomly the time slot channel for transmitting the transmission data. Step S203 corresponds to step S111 shown in FIG. 4 and is the frequency channel selection step in which the random selector 10 selects randomly the frequency channel for transmitting the transmission data. The spreading code channel selection step (step S201), the time slot channel selection step (step S202) and the frequency channel selection step (step S203) may be executed in any order.

In step S205, processing is executed by a combination of access methods selected by the random selector 10, i.e. one spreading code channel, one time slot channel and one frequency channel. Thereafter, in step S205, the spreading code generator 9 receives notice of the selected spreading code channel, the TDMA processor receives notice of the selected time slot channel and the FDMA processor 13 receives notice of the selected frequency channel.

On the other hand, the processing executed by the transmitter 7 after step S205 is performed in the following manner.

Firstly, the CDMA spreader 11 executes the CDMA-spreading step by CDMA spreading the transmission data using the selected spreading code channel.

Thereafter, the TDMA processor 12 executes the delay step by causing delay of the transmission data such that the CDMA-spread transmission data are transmitted in the selected time slot channel.

Finally, after the FDMA processor 13 executes the frequency conversion step to convert to the frequency corresponding to the selected frequency channel the frequency of the transmission data delayed by the aforementioned delay step, the wireless transmitter 34 executes the transmission step by transmitting the transmission data delayed in the delay step and frequency converted in the frequency conversion step.

Steps S201, S202 and S203 are explained below in further detail. At the processing of step S201, the random selector 10 selects randomly one spreading code channel. This corresponds to random selection of one spreading code from among the L (more than one) spreading codes that can be generated by the spreading code generator 9. The spreading code, for example, may be an orthogonal gold code. The number of selectable mutually orthogonal codes L, for example, may be 1024.

Furthermore, the spreading code generated by the spreading code generator 9 is synchronized with the GPS time signal at the chip level and is controlled so that the generated spreading codes transmitted from each of the communication terminals 3 are orthogonal to one another at the satellite transponder. However, the spreading codes are not limited to orthogonal codes, and may be non-orthogonal codes such as gold codes or M sequence codes. Although mutual interference between codes is almost eliminated by the use of orthogonal codes, mutual interference between codes increases if non-orthogonal codes are used.

In the processing of step S202, one frequency channel is selected randomly from among a plurality of, i.e. M count, frequency channels. For example, if the data transmission rate of transmission data transmitted by the communication terminal 3 using the return link communication lines 18 is assumed to be 50 bps, when the transmission data is error correction encoded at a coding rate of 1/2 and spread 1,024-times, then the chip rate becomes 50 bps×2×1, 024=102.4 kcps. Thus the required bandwidth of the BPSK-modulated wave after CDMA spreading is about 200 kHz. That is to say, this is the bandwidth of a single frequency channel, and if the total frequency band that can be used is assumed to be about, for example, 5 MHz, then 25 frequency channels are selectable.

In the processing of step S203, the random selector 10 selects randomly a single time slot from among N (count) time slots.

The total channel count becomes L×N×M. Thus even if communication terminals 3 transmit transmission data, i.e. short messages, almost at the same time, the probability of packet collision is small. Therefore a communication system is obtained that has high throughput and little retransmission processing.

A modified example of the random selector 10 is explained below in reference to FIG. 6.

Figure 6:
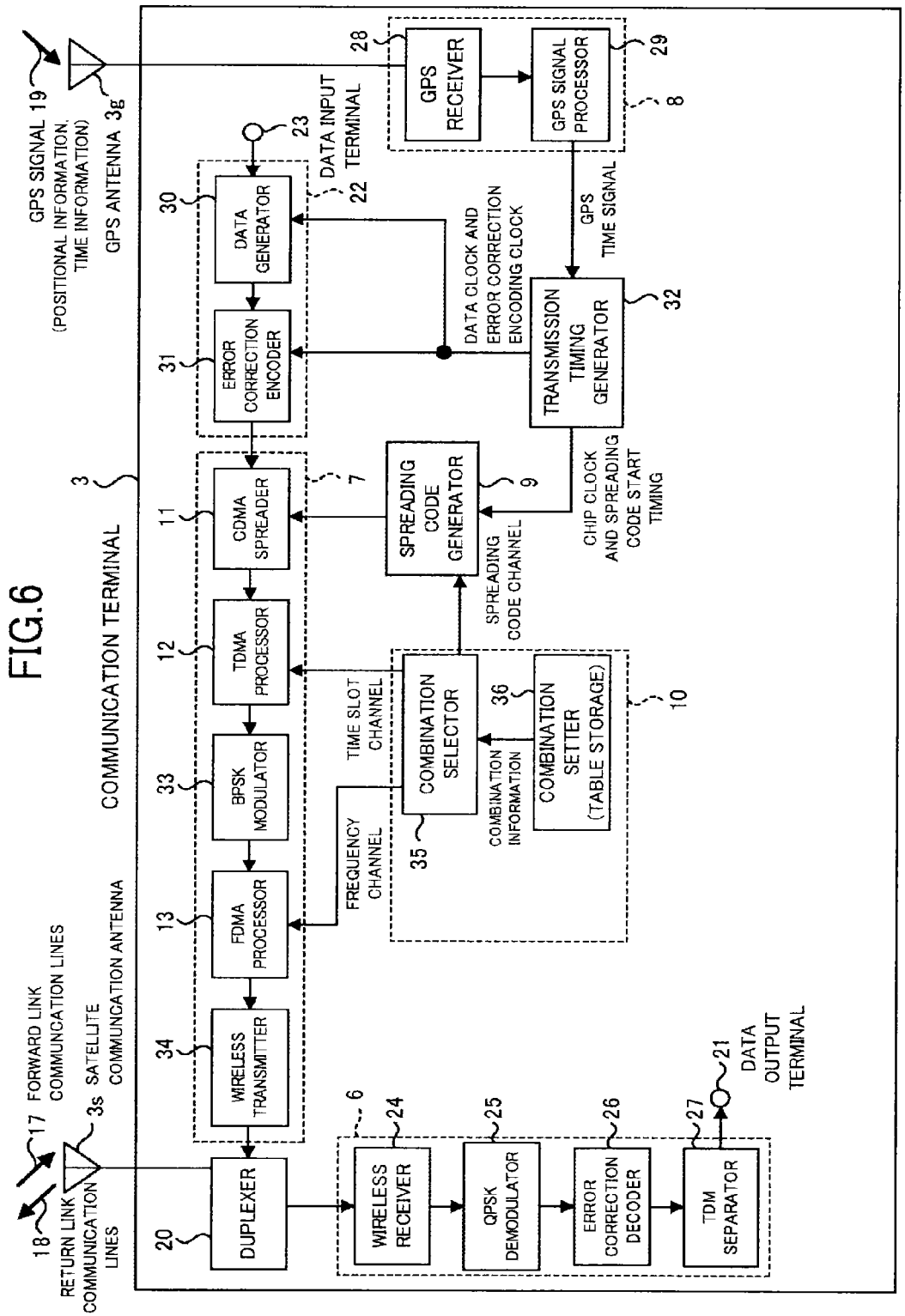
FIG. 6 is a block diagram explaining functions of the communication terminal according to a modified example of the first embodiment of the present disclosure.

As shown in FIG. 6, the random selector 10 of the first modified example is composed of a combination selector 35 and a combination setter (table storage) 36. Although the random selector 10 of the communication terminal 3 shown in FIG. 3 selected the spreading code channel, time slot channel and frequency channel separately from among set values, according to the communication terminal 3 shown in FIG. 6, the combination selector 35 selects randomly a combination of access methods based on a "table stored in the table storage (combination setter) 36" shown in FIG. 7A. Within the random selector 10, the combination setter 36 performs processing to send to the combination selector 35 information of the table, i.e. combination information.

Thus if processing is based on the "table stored in the table storage (combination setter) 36" shown in FIG. 7A, the spreading code channel selection step, the frequency channel selection step and the time slot channel selection step of the communication method of the first embodiment are performed by random selection of a combination from among the table of preset combinations of spreading code channels, frequency channels, and time slot channels.

The table shown in FIG. 7A stores combinations of each channel of the three table entry categories, i.e. the "spreading code channel", "frequency channel" and "time slot channel", without duplication, so that the random selector 10 can select randomly. Moreover, a selection number is provided for each combination. The values NNN, MMM, LLL and KKK of the final row of the table are all positive integers and may be different from one another. Furthermore, the time slot channel entries channel #1, #2, . . . , #KKK are arranged in order from earliest to latest.

When the communication terminal 3 shown in FIG. 6 receives the forward link signal, i.e. distress message service initiation signal, so that the random selector 10 is required to select the "spreading code channel", "frequency channel" and "time slot channel", the combination selector 35 selects randomly one selection number from among the selection numbers stored in the combination setter (table storage) 36, as a result each of the "spreading code channel", "frequency channel" and "time slot channel" is selected randomly.

For example, by the communication terminal 3A selecting the selection number 004, the communication terminal 3B selecting the selection number 001, and the communication terminal 3C selecting the selection number 002, combinations of access methods can be selected so that, among the communication terminals 3, there is no matching of all of three channel categories, i.e. "spreading code channel", "frequency channel" and "time slot channel". As the selection number NNN increases, probability to select combinations of access methods that are all different from one another with respect to the three channel categories is increased.

Furthermore, the communication terminal 3 shown in FIG. 6 simultaneously executes three processing steps shown in FIG. 4 as steps S109, S110 and S111. That is to say, the three processing steps shown in FIG. 5 as steps S201, S202 and S203 shown in FIG. 5 are executed simultaneously. Communication terminals 3 may each have the same table set and stored in the combination setter (table storage) 36, or alternatively, the communication terminals 3 may each have a unique table set and stored in the combination setter (table storage) 36.

For example, if the whole communication system is configured under a positive intent to make differences in time of communication between each of the communication terminals 3, a table may be prepared so that, among the time slot channels, relatively early time slot channels can be selected. Similar preference also applies for the case in which a table is not used. That is to say, when the time slot channel is selected by the random selector 10 shown in FIG. 2, random selection from among the relatively early time slot channels is preferred. Conversely, a table may be prepared so that relatively late time slot channels can be selected randomly. That is to say, when the random selector 10 shown in FIG. 2 selects the time slot channel, random selection of relatively late time slot channels is preferred.

The tables indicated as FIGS. 7B and 7C are examples in which there is the desire to arrange for differences in the start time of communication between each communication terminal 3. As shown in FIG. 7B, by setting of the table such that selection of the time slot channel is possible only from among the relatively early channels #1 and #2, communication of the communication terminal 3 utilizing this table can necessarily be performed relatively early. In the same manner, as shown in FIG. 7C, by setting of the table such that selection of the time slot channel is possible only from among the relatively late channels #3 and #4, communication of the communication terminal 3 using this table can necessarily be performed relatively late. Although FIGS. 7B and 7C show the number of selectable time slots channels as 4, i.e. the case of KKK equal to 4, and show a time slot channel count of two time slot channels in each table, this is merely an illustrative example.

That is to say, when the communication terminal 3 of the first embodiment is configured to communicate relatively early, in comparison to a communication terminal 3 without such configuration, the probability of the random selector 10 being able to select a relatively early time slot channel as the time slot for transmitting the transmission data can be increased. In the same manner, in the case of configuration for relatively delayed communication, in comparison to the case without such configuration, the probability of the random selector 10 being able to select a relatively late time slot channel as the time slot for transmitting the transmission data can be increased. In other words, in a configuration in which the communication terminal 3 of the first embodiment is a communication terminal 3 for which relatively early communication is desired, in comparison to a communication 3 without such a desire for configuration, the random selector 10 can be said to select the time slot for transmitting transmission data by the transmitter 7 randomly from among relatively early time slot channels within the selectable range. Similarly, in a configuration in which there is a desire to make the communication of the communication terminal 3 relatively late, in comparison to a communication 3 without such a desire for configuration, the random selector 10 can be said to select the time slot, i.e. basis of the time to delay of transmission of transmission data by the transmitter 7, randomly from among relatively late time slot channels within the selectable range.

Selection processing of the random selector 10 is explained below in the case of using table information.

When there is no communication terminal 3 for which relatively early communication is desired among the communication terminals 3, the combination setter 36 preferably supplies to the combination selector 35 the information, i.e. combination information, of the table shown in FIG. 7A. However, when there is a communication terminal 3 for which relatively early communication is desired among the communication terminals 3, the combination setter 36 of such a communication terminal 3 preferably supplies to the combination selector 35 the information, i.e. combination information, of the table shown in FIG. 7B. However, when there is a communication terminal 3 for which relatively late communication is desired among the communication terminals 3, the combination setter 36 of such a communication terminal 3 preferably supplies to the combination selector 35 the information, i.e. combination information, of the table shown in FIG. 7C.

Furthermore, in the case of the supply to the combination selector 35 of information of the table shown in FIG. 7B, in the other optionally-plural communication terminal 3, the information of the table shown in FIG. 7C may be supplied to the combination selector 35, or the information of the table used in usual cases shown in FIG. 7A may be supplied to the combination selector 35. Of course, in the case of the supply to the combination selector 35 of information of the table shown in FIG. 7C, in the other optionally-plural communication terminal 3, the information of the table shown in FIG. 7B may be supplied to the combination selector 35, or the information of the table used in usual cases shown in FIG. 7A may be supplied to the combination selector 35.

Second Embodiment

Figure 8:
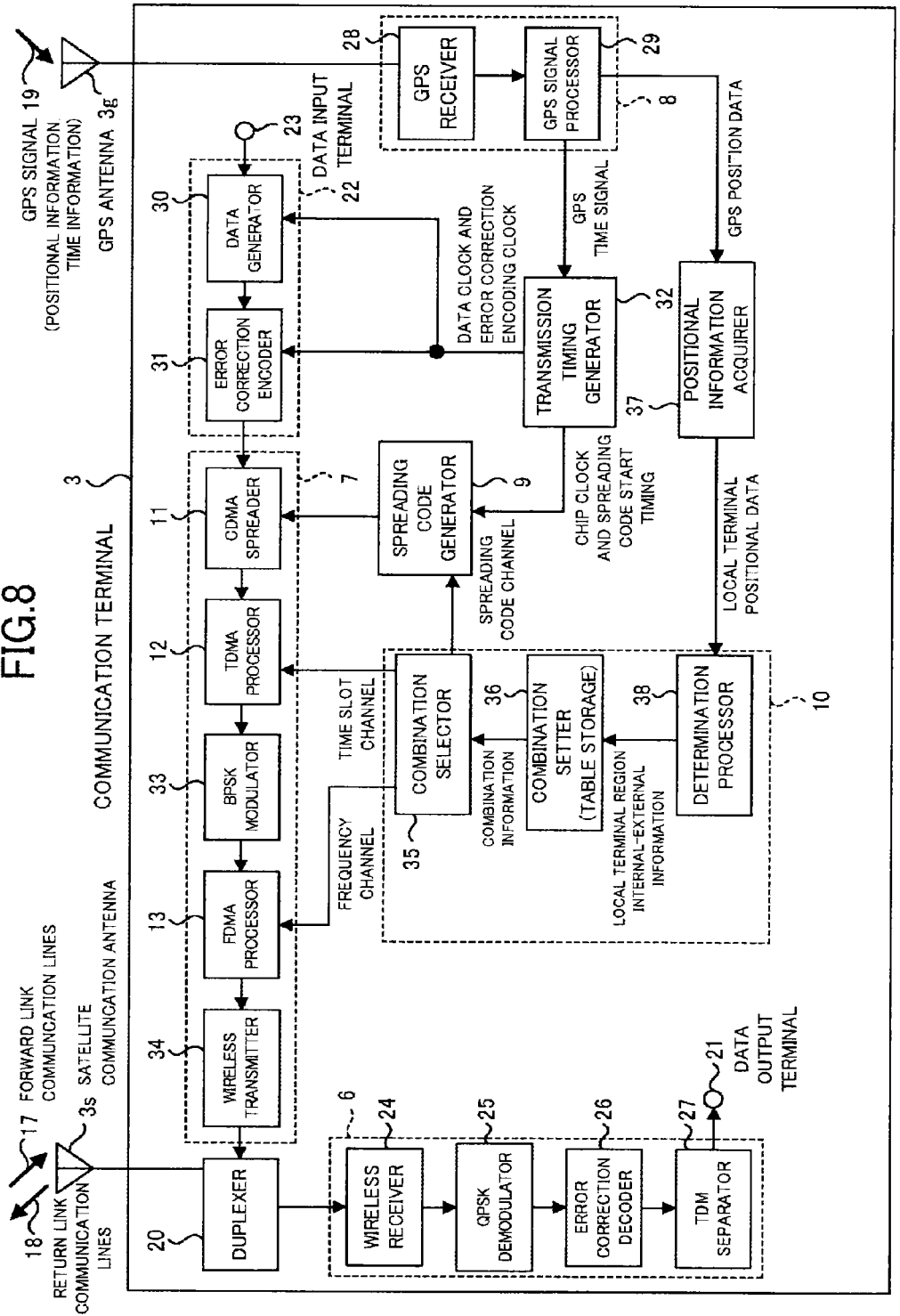
FIG. 8 is a block diagram explaining functions of the communication terminal according to the second embodiment of the present disclosure.
Figure 9:
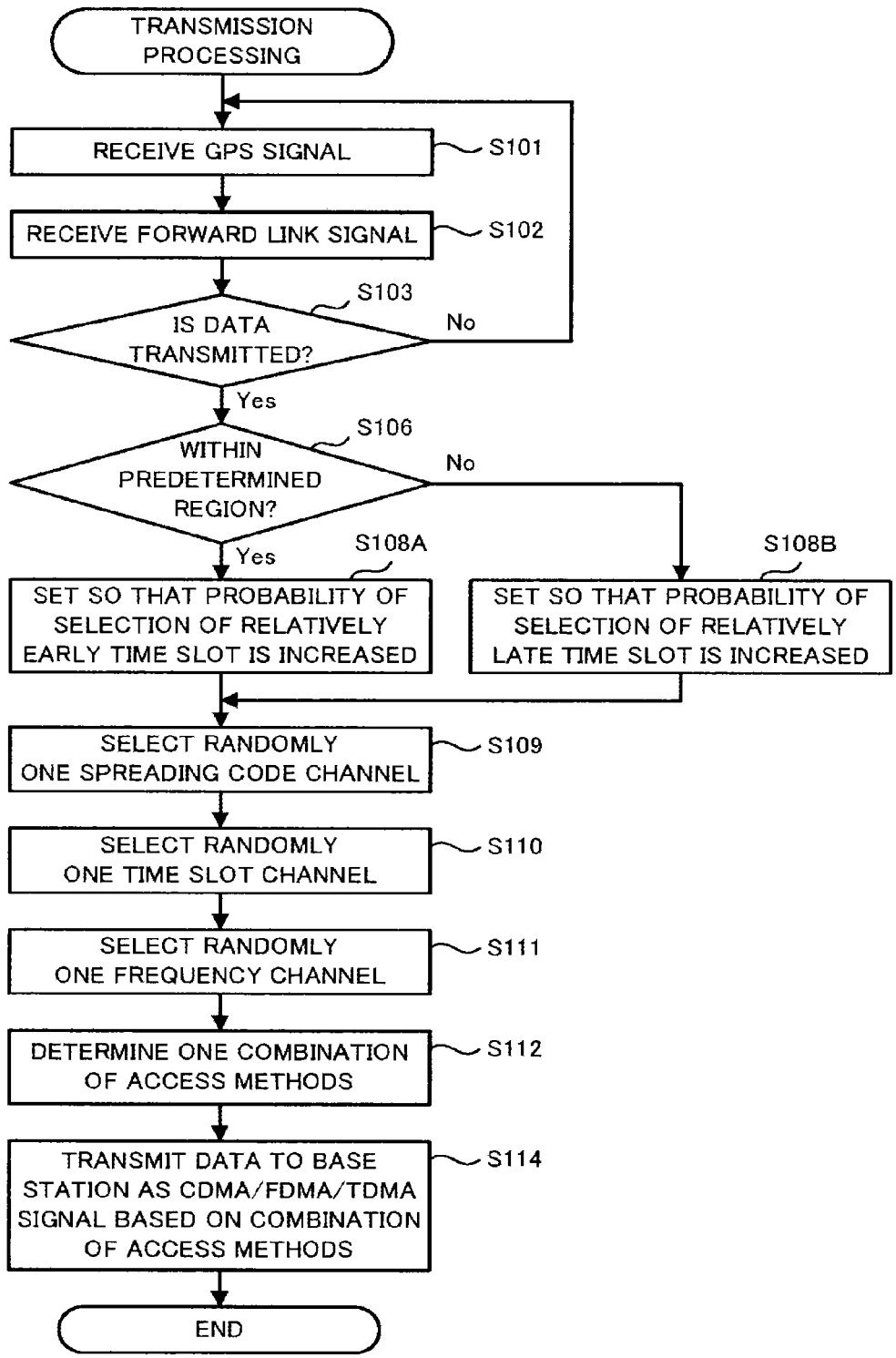
FIG. 9 is a flowchart showing transmission processing of the communication terminal according to the second embodiment of the present disclosure.

A second embodiment of the present disclosure is explained in reference to FIGS. 8 and 9. The second embodiment is an example of a communication system that makes proactively differences in time of communication between each of the communication terminals 3 of the whole communication system. In the second embodiment, parts that are the same as those of the first embodiment are assigned the same reference signs.

As shown in FIG. 8, the communication terminal 3 further includes a positional information acquirer 37 and a determination processor 38.

The positional information acquirer 37 acquires from the information acquirer 8 positional information of the local terminal, i.e. local terminal positional data, and supplies the local terminal positional data to the random selector 10. The positional information acquirer 37 is connected to the information acquirer 8, i.e. GPS signal processor 29. Specifically, the positional information acquirer 37 acquires the GPS positional information processed by the GPS signal processor 29.

The determination processor 38, from the positional information of the local terminal acquired by the positional information acquirer 37, determines whether the position of the local terminal is within a predetermined range, and notifies the combination setter (table storage) 36 of the result of such determination.

That is to say, the random selector 10 determines the position of the communication terminal 3 based on positional information acquired from the outside, i.e. positional information acquired from GPS information.

The random selector 10 is composed of a combination selector 35, combination setter (table storage) 36 and determination processor 38. The positional information acquirer 37 may be incorporated in the random selector 10. Furthermore, the positional information acquirer 37 may acquire the positional information of the local terminal by a method other than receiving the GPS signal 19 from the GPS satellite 4. For example, the positional information may be acquired from an external device connected to the communication terminal 3, or the positional information may be acquired by input from the operation part 98 of the communication terminal 3.

According to the communication terminal 3 shown in FIG. 8, the positional information acquirer 37 acquires GPS positional information from the GPS signal processor 29, performs analysis to find the position of the local terminal, and supplies the positional information of the local terminal to the determination processor 38. The determination processor 38 stores in internal memory regional information, i.e. range information, indicating predetermined regions.

Based on the stored regional information and the positional information of the local terminal acquired from the positional information acquirer 37, the determination processor 38 generates local terminal region internal-external information indicating whether the local terminal is within or outside of a predetermined region, and the local terminal region internal-external information is supplied to the combination setter 36.

When the local terminal region internal-external information supplied from the determination processor 38 indicates that the position of the local terminal is within the predetermined region, the combination setter 36 sends to the combination selector 35 information (combination information) of a table that can select a relatively early transmission slot. This type of table information, for example, is the table shown in FIG. 7B. By this means, the probability of early communication by the communication terminal 3 located within a predetermined region becomes relatively high, and the probability of early communication of a communication terminal 3 located outside the predetermined region becomes relatively low.

On the other hand, when the local terminal region internal-external information indicates that the position of the local terminal is outside the predetermined region, the combination setter 36 transmits to the combination selector 35 table information that can select a time slot that is relatively late. This type of table information, for example, is indicated by the table of FIG. 7C. By this means, the probability of early communication by the communication terminal 3 located outside of a predetermined region becomes relatively low, and the probability of early communication of a communication terminal 3 becomes relatively high when the position of the local terminal is within the predetermined region. Furthermore, when the position of the local terminal is outside the predetermined region, the combination setter 36 may transmit to the combination selector 35 the information of the table used in usual cases. The information of the table used in usual cases, for example, is the table shown in FIG. 7A.

The regional information indicating the predetermined region and stored beforehand by the determination processor 38 is information indicating a region where there is high necessity for early communication when present within the predetermined region in comparison to a communication terminal 3 that exists outside of the predetermined region. Although this second embodiment is explained for a communication terminal 3 in which the determination processor 38 retains beforehand regional information showing the predetermined region, in the below described third embodiment, a communication terminal 3 is explained that acquires the regional information from an external source.

In this manner, the combination setter 36 acquiring the local terminal region internal-external information from the determination processor 38 supplies to the combination selector 35 the aforementioned table information, i.e. combination information, according to the local terminal region internal-external information. The combination selector 35 selects randomly a single combination of spreading code channel, frequency channel and time slot channel from among the acquired table information. In the case of the tables shown in FIGS. 7A to 7C, the combination selector 35 selects randomly a selection number. Thereafter, the combination selector 35 sends the selected spreading code channel to the spreading code generator 9, sends the selected time slot channel to the TDMA processor 12, and sends the selected frequency channel to the FDMA processor 13.

The communication method of the second embodiment is explained in reference to FIG. 9. FIG. 9 is a flowchart showing transmission processing of the communication terminal 3 according to the second embodiment.

This flowchart indicates the communication method executing by the communication terminal 3 transmitting CDMA-spread transmission data to the base station 2 via the satellite 1. Steps S101, S102, S103, S109-S111 and S114 are the same as those shown in FIG. 5.

After the processing of step S103, or after the processing of step S102 when step S103 is omitted, the positional information acquirer 37 performs a communication terminal position acquisition step to acquire the position of the communication terminal 3.

Thereafter, the determination processor 38 determines whether the local terminal 3 is located within the predetermined region, based on the local terminal positional information from the positional information acquirer 37 and the regional information possessed beforehand by the combination setter 36 (step S106).

When the determination processor 38 determines that the position of the local terminal is within the predetermined region (result of step S106=YES), the combination setter 36 sets higher the probability of selecting a relatively early time slot channel at the selecting of the time slot channel (step S108A).

For example, the determination processor 38 controls the combination setter 36 to supply to the combination selector 35 the table indicated as FIG. 7B.

On the other hand, when the position of the local terminal is determined to be outside the predetermined region (result of step S106=NO), the combination setter 36 sets higher the probability of selecting a relatively late time slot channel at selection of the time slot channel (step S108B). For example, the determination processor 38 performs control at step 108A so that the combination setter 36 supplies the table shown in FIG. 7B to the combination selector 35, and performs control at step 108B so that the combination setter 36 supplies the table shown in FIG. 7A or 7C to the combination selector 35. Alternatively, the determination processor 38 performs control at step S108A so that the combination setter 36 supplies the table shown in FIG. 7A to the combination selector 35, and performs control at step 108B so that the combination setter 36 supplies the table shown in FIG. 7C to the combination selector 35.

Thereafter, the random selection of the spreading code is executed at step S109.

Thereafter, the random selector 10 at step S110 selects randomly one time slot channel.

The processing of the time slot channel selection step, i.e. step S110, increases probability to select a relatively early time slot channel when the position of the communication terminal 3 is within the predetermined region in comparison to when the position is not within the predetermined region; and increases probability to select a relatively late time slot channel when the position of the communication terminal 3 is outside of a predetermined region in comparison to when the position is within the predetermined region. Moreover, the processing of the time slot channel selection step, i.e. step S110, when the communication terminal 3 position is within the predetermined region, in comparison to when the position is not within the predetermined region, selects randomly a relatively early time slot channel from among the time slot channels within the selectable range; and when the communication terminal 3 position is outside the predetermined region, in comparison to when the position is within the predetermined region, selects randomly a relatively late time slot channel from among the time slot channels within the selectable range.

Thereafter, one frequency channel is selected at the step S111; and at step S112, the random selector determines one combination of access methods that combines the selected spreading code channel, time slot channel, and frequency channel. Thereafter, step S114 is executed to cause transmission of CDMA-spread transmission data using the time slot channel selected at the time slot channel selection step, using the frequency corresponding to the frequency channel selected at the frequency channel selection step, and using the spreading code channel selected at the spreading code channel selection step.

Furthermore, in the present embodiment, the steps S109 to S111 are performed simultaneously by the combination selector 35 selecting a single combination.

Third Embodiment

A third embodiment of the present disclosure is explained in reference to FIGS. 10 to 15C. In the second embodiment, the determination processor 38 of the communication terminal 3 possesses beforehand regional information indicating the predetermined region. On the other hand, in the third embodiment, the determination processor 38 acquires the regional information from outside, and in particular, the communication terminal 3 acquires the regional information from the base station 2. In the third embodiment, parts that are the same as those of the first embodiment and the second embodiment are assigned the same reference signs.

Figure 10:
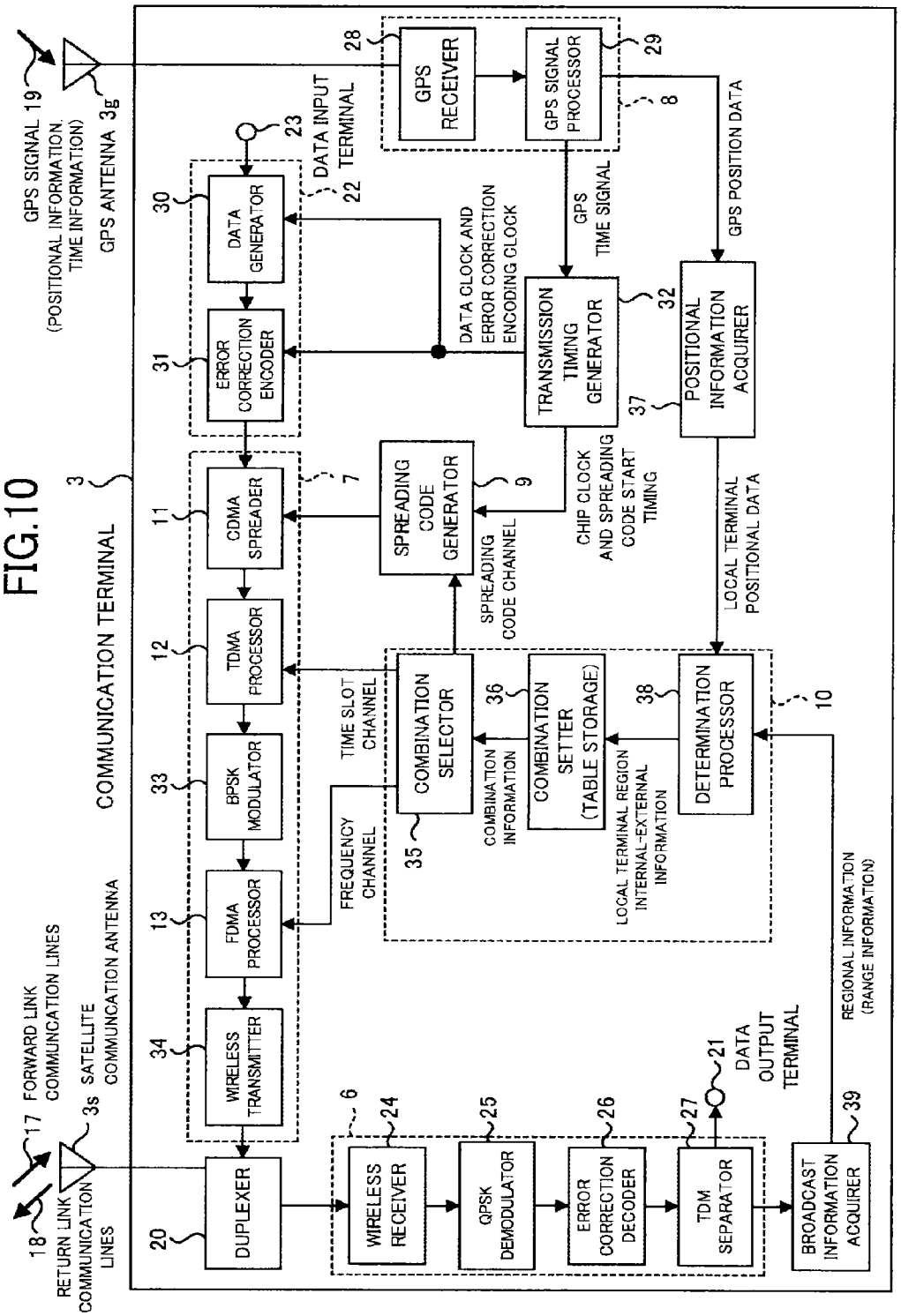
FIG. 10 is a block diagram explaining functions of the communication terminal according to the third embodiment of the present disclosure.

As shown in FIG. 10, in the same manner as the second embodiment, the random selector 10 of the communication terminal 3 of the third embodiment determines the position of the local terminal from positional information acquired from GPS information. That is to say, the communication terminal 3 is equipped with an information acquirer 8 that acquires GPS information from the satellite 1 or the GPS satellite 4, and the information acquirer 8 acquires positional information from the GPS information.

The communication terminal 3 is equipped with a receiver 6 for receiving the forward link signal transmitted by the base station 2 and a transmitter 7 for transmitting the return link signal.

The communication terminal 3 of the third embodiment further includes a broadcast information acquirer 39. The broadcast information acquirer 39 acquires the regional information showing the predetermined region transmitted from the base station 2 and separated from received data by the TDM separator 27, and the broadcast information acquirer 39 supplies the regional information to the determination processor 38. Here, because the regional information is delivered from the base station 2 as the same information to the plurality of terminals 3, the regional information may be termed "broadcast information".

Figure 11:
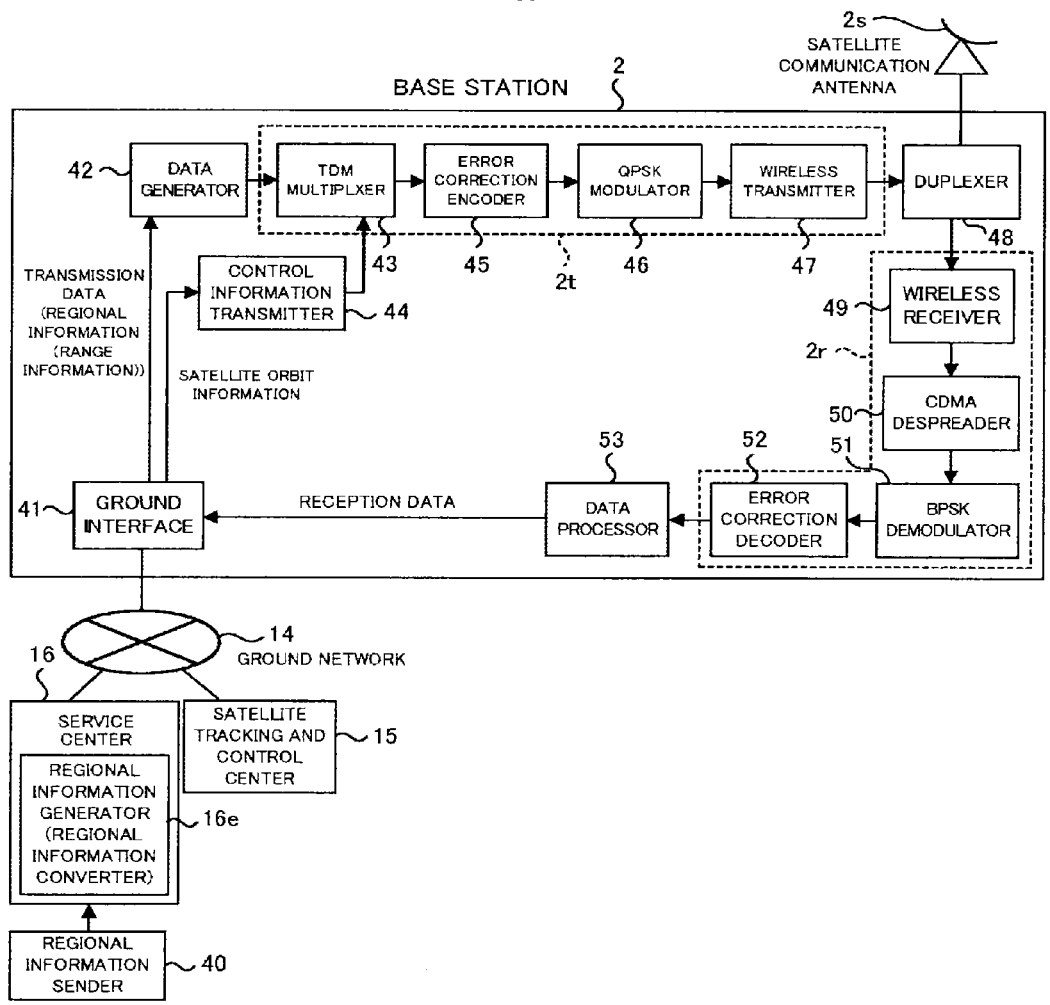
FIG. 11 is a block diagram (schematic drawing of the communication system) of functions of the base station according to the third embodiment of the present disclosure.

As shown in FIG. 11, the basic configuration of the base station 2 of the third embodiment is the same as that of the base station 2 of the other embodiments.

As shown in FIG. 11, the base station 2 includes a base station transmitter 2t, base station receiver 2r, ground interface 41, data generator 42, control information transmitter 44, data processor 53 and duplexer 48.

The base station transmitter 2t transmits the forward link signal, which is a trigger of transmitting the return link signal from the communication terminals 3 to the base station 2, to the communication terminals 3. The base station transmitter 2t includes a TMD multiplexer 43, error correction encoder 45, QPSK modulator 46 and wireless transmitter (base station-side transmitter) 47. The TMD multiplexer 43 performs TDM multiplexing of the transmission data, for example, regional information, acquired from the data generator 42 and the control data, for example, satellite orbital information, acquired from the control information transmitter 44. The error correction encoder 45 performs error correction encoding of the transmission data TDM multiplexed by the TDM multiplexer 43. After the error correction encoding of the transmission data by the error correction encoder 45, the QPSK modulator 46 performs QPSK modulation of the error correction-encoded transmission data. The wireless transmitter 47 converts to RF frequency the transmission data QPSK modulated by the QPSK modulator 46, and then amplifies the frequency-converted transmission data to large power.

The base station receiver 2r receives from the communication terminals 3 the return link signal CDMA-spread using a spreading code generated using spreading code start timing synchronized among the communication terminals 3 and generated from time information obtained from the satellite 1 or GPS information. The base station receiver 2r includes a wireless receiver (base station-side receiver) 49, CDMA despreader 50, BPSK demodulator 51 and error correction decoder 52. The wireless receiver 49 amplifies the return link signal acquired from the duplexer 48, without increasing noise included in the return link signal, and supplies the so-called low-noise amplified signal to the CDMA despreader 50. The CDMA despreader 50 performs frequency conversion of the received low-noise amplified signal supplied from the wireless receiver 49 to an IF frequency signal, and acquires the chip clock and spreading code start timing from the received CDMA signal to perform CDMA despreading. The BPSK demodulator 51 BPSK demodulates the signal despread by the CDMA despreader 50 of the base station 2. The error correction decoder 52 performs error correction decoding of the signal BPSK demodulated by the BPSK demodulator 51.

The duplexer 48 separates electrically the transmission pathway from the signal reception pathway of the satellite communication antenna (base station-side satellite communication antenna) 2s, which is used for both of transmitting the forward link signal and receiving the return link signal. The ground interface 41 receives data transmitted from the service center 16 and to be transmitted to the communication terminal 3 via the ground network 14. Furthermore, the ground interface 41 also receives data, which is mainly satellite orbital information, transmitted from the satellite tracking and control center 15 via the ground network 14. The data generator 42 receives from the ground interface 41 data transmitted to each of the communication terminals 3, and generates transmission data for each of the communication terminals 3. The control information transmitter 44 sends to the TMD multiplexer 43 control data, such as satellite orbital information.

The data processor 53, from the signal performed error correction decoding in the error correction decoder 52, forms data for output to the service center 16, and sends the formed data to the ground interface 41. The data processed by the data processor 53 is sent to the service center 16 from the ground interface 41 via the ground network 14.

The regional information sender 40 sends to the service center 16 information that forms the basis of the regional information indicating the predetermined region and being to be transmitted from the base station 2 to the communication terminal 3. Via the ground network 14, the service center 16 sends to the base station 2 the regional information acquired from the regional information sender 40.

When the information transmitted from the regional information sender 40 cannot be used as regional information indicating the predetermined region for the communication terminal 3 receiving such information, for example, when such information is just a simple place name of the disaster-stricken area, then a regional information generator (regional information converter) 16e provided for the service center 16 converts the information acquired from the regional information sender 40 to regional information that can be used by the communication terminal 3, and then the converted regional information is sent to the base station 2. Furthermore, the base station 2 may be equipped with the regional information generator 16e.

Figure 12A:
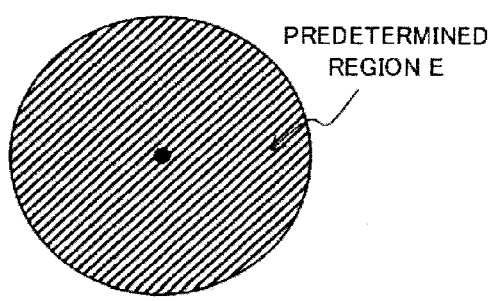
FIG. 12A is a drawing of a predetermined region (circular) obtained from information of the center (geometric center) according to the third embodiment of the present disclosure.
Figure 12B:
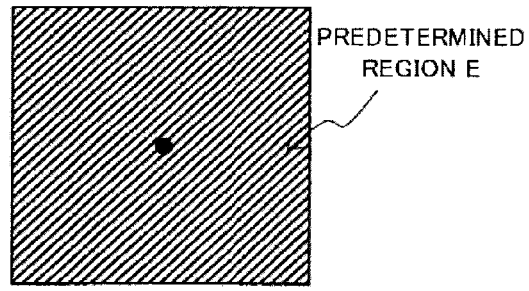
FIG. 12B is a drawing of a predetermined region (square) obtained from information of the center (geometric center) according to the third embodiment of the present disclosure.
Figure 12C:
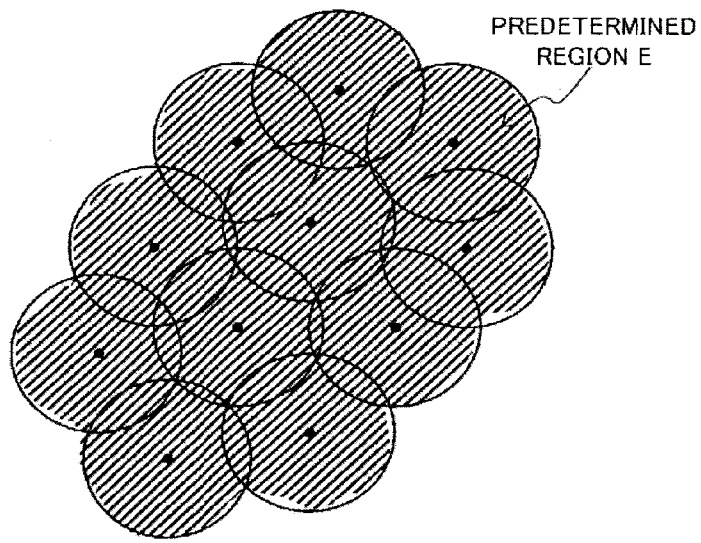
FIG. 12C is a drawing of a predetermined region (set of a plurality of circles) obtained from information of the center (geometric center) according to the third embodiment of the present disclosure.
Figure 13A:
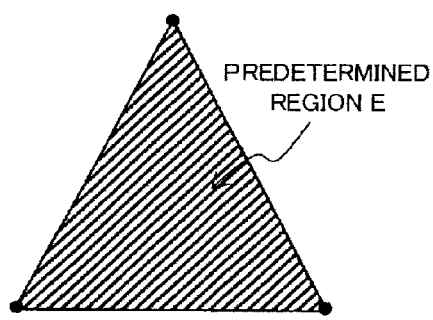
FIG. 13A is a drawing showing a predetermined region (triangular) obtained from a plurality of points and radius or diagonal line distance information according to the third embodiment of the present disclosure.
Figure 13B:
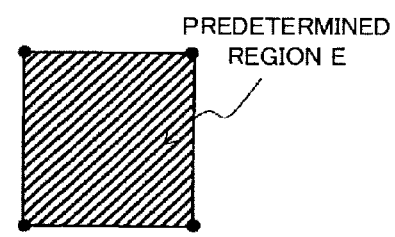
FIG. 13B is a drawing showing a predetermined region (square) obtained from a plurality of points and radius or diagonal line distance information according to the third embodiment of the present disclosure.
Figure 13C:
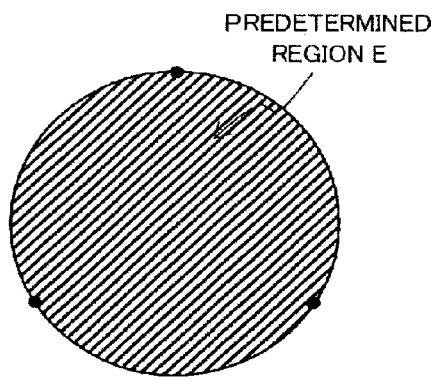
FIG. 13C is a drawing showing a predetermined region (circular) obtained from a plurality of points and radius or diagonal line distance information according to the third embodiment of the present disclosure.
Figure 13D:
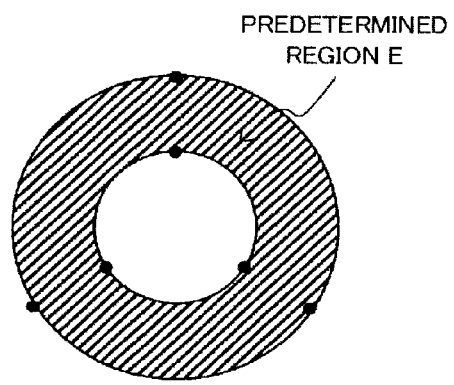
FIG. 13D is a drawing showing a predetermined region (annular shape) obtained from a plurality of points and radius or diagonal line distance information according to the third embodiment of the present disclosure.
Figure 14A:
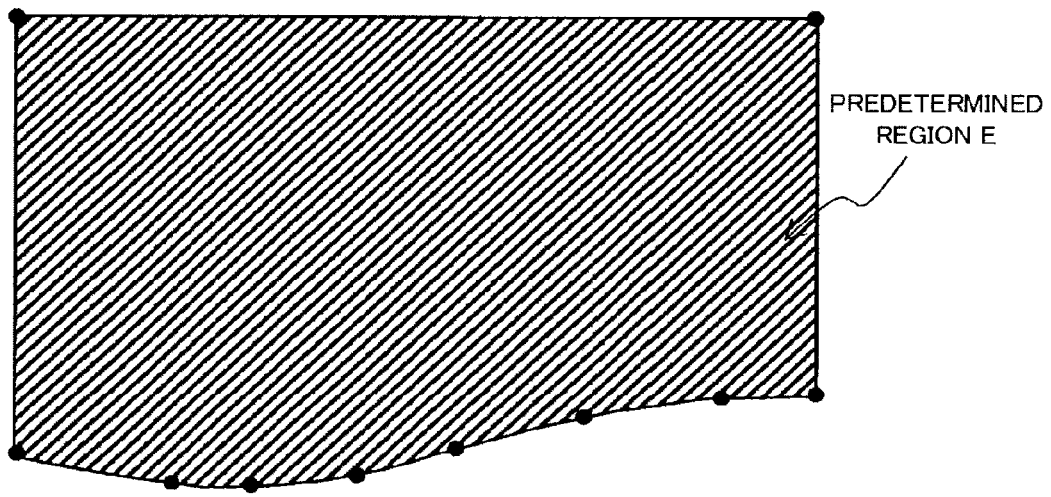
FIG. 14A is a drawing showing a predetermined region obtained from a plurality of coordinates according to the third embodiment of the present disclosure, in which the region (substantial square) is bounded by a boundary line interconnecting a plurality of points.
Figure 14B:
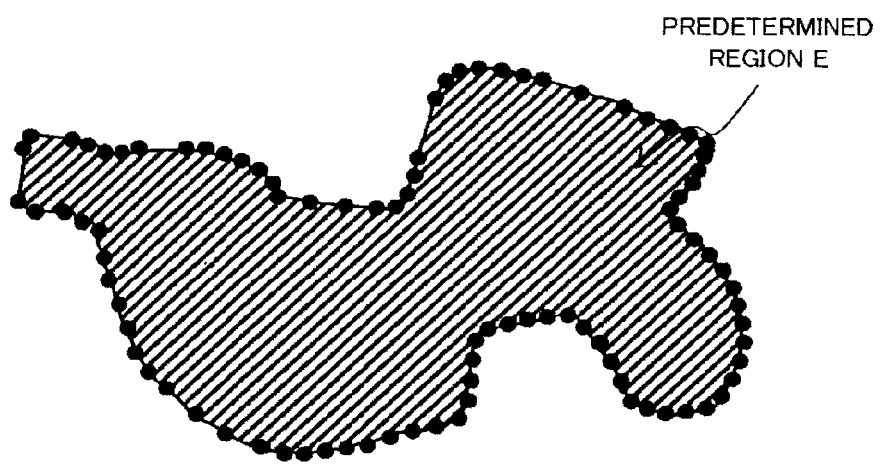
FIG. 14B is a drawing showing a predetermined region obtained from a plurality of coordinates according to the third embodiment of the present disclosure, in which the region (cloud-shaped) is bounded by a boundary line interconnecting a plurality of points.

The predetermined region is explained next in reference to FIGS. 12A to 15C. FIGS. 12A to 15C show predetermined regions derived from the regional information and delivered from the base station 2 to the communication terminal 3 via the forward link communication lines 17. Within the figures, the black dot "●" is a point determined from latitude and longitude coordinates acquired from the regional information. Moreover, the hatched-line region shown in the figures is the predetermined region formed from the latitude and longitude coordinates acquired from the regional information. FIG. 12A shows a circular predetermined region E formed from the acquired coordinates of the center, i.e. geometric center. FIG. 12B shows a square-shaped predetermined region E formed from the acquired coordinates of the center, i.e. geometric center. FIG. 12C shows a predetermined region E formed from the acquired coordinates of the center, i.e. geometric center, and composed of a plurality of circles. FIG. 13A shows a triangular predetermined region E formed from the acquired coordinates of vertices. FIG. 13B shows a square-shaped predetermined region E formed from the acquired coordinates of vertices. FIG. 13C shows a circular predetermined region E formed from the acquired coordinates of 3 points on a circumference of a circle. FIG. 13D shows a doughnut-shaped predetermined region E, which is a circular region formed from the acquired coordinates of 3 points on a circumference of a circle, from which another circular region (also formed from acquired coordinates of 3 points on a circumference of a circle) enclosed by this circle is removed. FIGS. 14A and 14B show predetermined regions E formed from the coordinates of a plurality of provided points.

Figure 15A:
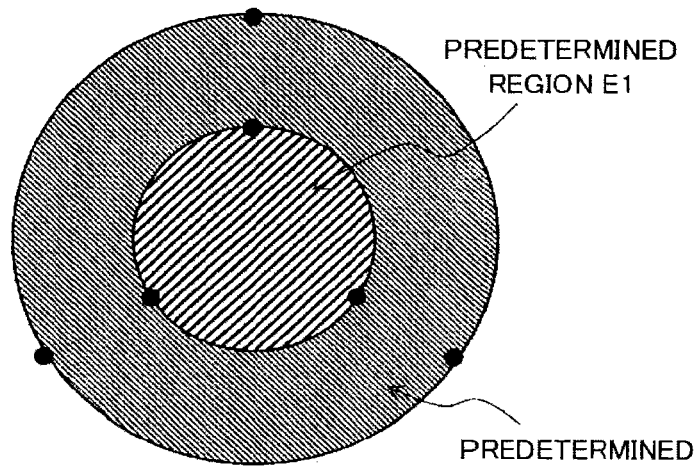
FIG. 15A is a drawing showing a plurality of predetermined regions obtained from positional information according to the third embodiment of the present disclosure, as an example in which the predetermined region surrounds a separate predetermined region (circular/circular)
Figure 15B:
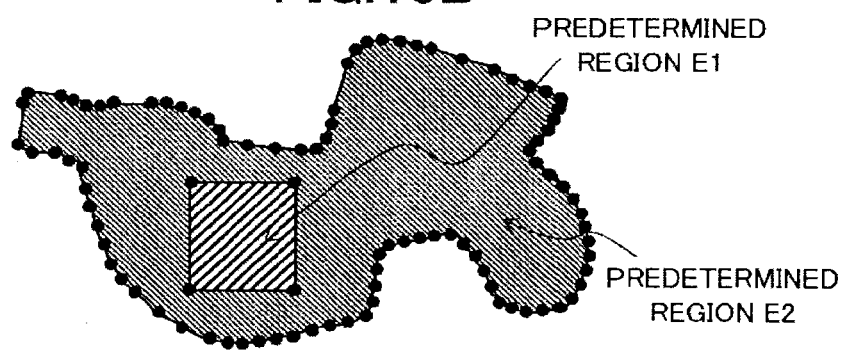
FIG. 15B is a drawing showing a plurality of predetermined regions obtained from positional information according to the third embodiment of the present disclosure, as an example in which the predetermined region surrounds a separate predetermined region (cloud-shaped/square)
Figure 15C:
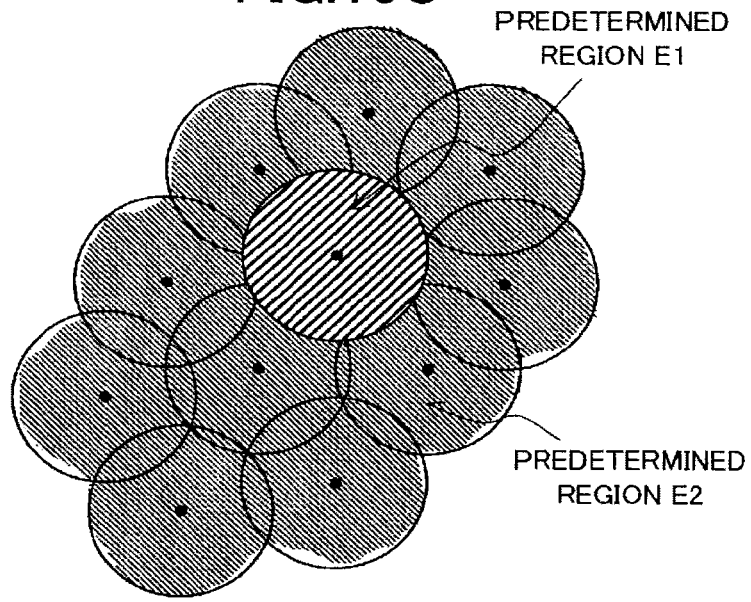
FIG. 15C is a drawing showing a plurality of predetermined regions obtained from positional information according to the third embodiment of the present disclosure, as an example in which the predetermined region surrounds a separate predetermined region (set of a plurality of circles/circle)

Furthermore, FIG. 15A shows a circular-shaped predetermined region E1 formed from acquired coordinates of 3 points on a circumference of a circle, and shows a predetermined region E2, which is a circular region (this circle is also formed from acquired coordinates of 3 points on a circumference of a circle) enclosing this predetermined region E1, from which the region E1 is removed. FIG. 15B shows a predetermined region E2 formed from a plurality of acquired coordinates, and shows a square-shaped predetermined region E1 enclosed by the predetermined region E2, the shape of the square being formed from acquired coordinates of the vertices of the square. FIG. 15C shows a predetermined region E2 composed of a plurality of circles formed from the acquired coordinates of a plurality of centers, i.e. geometric centers, and shows a circular predetermined region E1 formed from acquired coordinates of a center, i.e. geometric center.

As shown in FIG. 11, the information supplied from the regional information sender 40 is converted by the data generator 42 into transmission data that includes regional information indicating the predetermined region based on predetermined conditions, that is subjected to signal processing by the base station transmitter 2t, and that is transmitted to the communication terminal 3 as the forward link signal.

The communication terminal 3 receiving the forward link signal then acquires the predetermined regional information from the received forward link signal. When the position of the communication terminal 3 is within the predetermined region, in comparison to the case of the position not being within the predetermined region, the random selector 10 of the communication terminal 3 increases the probability of selecting the time slot channel from among the relatively early time slot channels used by the transmitter 7 for transmitting transmission data. Furthermore, when the position of the communication terminal 3 is outside the predetermined region, in comparison to the case of the position being within the predetermined region, the random selector 10 of the communication terminal 3 may decrease the probability of selecting the time slot channel from among the relatively early time slot channels.

The combination of access methods selected by the random selector 10 of the communication terminal 3, i.e. spreading code channel, time slot channel and frequency channel, are used to transmit the return link signal to the base station 2. The return link signal is received through the satellite communication antenna 2s of the base station 2, is processed by the base station receiver 2r and data processor 53, and is sent to the service center 16 from the ground interface 41 via the ground network 14. Thus the service center 16 is able to acquire information from communication terminals 3. When the communication system 100, i.e. base station 2 and communication terminal 3, of the third embodiment is used for a service such as transmitting short messages, for example, such as safety information including individual identification information (ID information) and positional information, then the service center 16 is able to acquire the safety information including individual identification information (ID information) and positional information of the communication terminals 3 and the users thereof.

When the communication system 100, i.e. base station 2 and communication terminal 3, of the third embodiment is used for a service such as transmitting short messages such as safety information including the individual identification information (ID information) and positional information, then the predetermined region indicates a region such as a disaster-stricken area when a disaster occurs. Thus the regional information sender 40 transmits to the service center 16 data of the disaster-stricken area as regional information. However, when this information about the disaster-stricken area is unable to be used as regional information indicating the predetermined region for the communication terminal 3 receiving the information, e.g. when the information about the disaster-stricken area is simply the place name of the disaster-stricken area, as shown in FIGS. 14A to 14B, the regional information generator (regional information converter) 16e provided for the service center 16 is required to convert the information from the regional information sender 40, before sending the converted information to the base station 2. Here, the information converted by the regional information generator (regional information converter) 16e means predetermined regional information set based on predetermined conditions.

Examples of the predetermined conditions are "when the information sent from the regional information sender 40 to the service center 16 (regional information generator 16e) is a place name, covert such information to positional information for indicating a single point indicating the latitude and longitude coordinates or address of a well-known building such as a government office or landmark in the region to which the place name belongs", and "when the information sent from the regional information sender 40 to the service center 16 (regional information generator 16e) is a place name, covert such information to positional information for indicating a plurality of points indicating the latitude and longitude coordinates of a region including the address of a well-known building such as a government office or landmark in the region to which the place name belongs".

In the case of the former, the "single point for indication of positional information" converted to positional information for indicating a single point indicating the coordinates of latitude and longitude of the position or address of a well-known building is generated by the data generator 42 as transmission data that include the "single point for indication of positional information". The transmission data generated by the data generator 42 is transmitted to each of the communication terminals 3 as the forward link signal from the base station transmitter 2t. Thereafter, the communication terminals 3 receiving the forward link signal use the TDM separator 27 to separate out the positional information and supplies the positional information to the broadcast information acquirer 39. Thereafter, a predetermined region set based on the predetermined conditions from positional information of a single point is calculated.

When the predetermined region is calculated based on the predetermined conditions from positional information of a single point, the determination processor 38 or broadcast information acquirer 39 of the communication terminal 3, for example, calculates the predetermined region E using the point as the center (center of mass) as shown in FIG. 12A, calculates the predetermined region E using the point as the center of mass (center) of a square shape (the predetermined region E may use the point as the center of mass (center) of a polygonal shape) as shown in FIG. 12B, or the like. Furthermore, information of the radius, the diagonal line distance, or the square measure of the predetermined region E may be predetermined, and may be stored in the determination processor 38 or broadcast information acquirer 39 of the communication terminal 3. Moreover, information of the predetermined region E, such as the radius, the diagonal line distance, or the square measure, may be set by the regional information sender 40 or regional information generator (regional information converter) 16e, and may be transmitted together with the positional information using the forward link signal.

In the case of the latter, the "positional information indicated by a plurality of points" converted to positional information indicated by a plurality of points expressed by coordinates based on the latitude and longitude of the region indicating the address of a famous building is generated by the data generator 42 as transmission data including "positional information indicated by a plurality of points". Through the ground interface 41, the base station transmitter 2t transmits the plurality of points of positional information as the forward link signal to each of the communication terminals 3. Thereafter, the TDM separator 27 of the communication terminal 3 receiving the forward link signal separates out the positional information and supplies the positional information to the broadcast information acquirer 39. Thereafter, from positional information of the plurality of points, the predetermined region set by the predetermined conditions is calculated.

When the predetermined region is calculated based on predetermined conditions using positional information of a plurality of points, the determination processor 38 or the broadcast information acquirer 39 of the communication terminal 3 calculates the predetermined region E, such as: the predetermined region E composed of a plurality of circles and having single points as the centers (geometric centers) of each circle as shown in FIG. 12C; the predetermined region E having a plurality of points (three points) as vertices of a triangle as shown in FIG. 13A; the predetermined region E having a plurality of points (four points) of a quadrangle as vertices as shown in FIG. 13B (alternatively the predetermined region E may have a polygonal shape with a plurality of acquired points as vertices); the predetermined region E composed of a circle shape having a plurality of points (three points) on a circumference of the circle as shown in FIG. 13C; the doughnut-shaped predetermined region E as shown in FIG. 13D, which is a circular region, a plurality of (three) points being on a circumference of the circle, from which another circular region (also formed of 3 points on a circumference of the other circle) enclosed by this circle is removed; a predetermined region E enclosed by a perimeter boarder formed by interconnecting a plurality of points as shown in FIG. 14A or FIG. 14B; or the like. Information of the radius, the square measure or the like of the predetermined region E may be determined beforehand, and may be stored in the determination processor 38 or broadcast information acquirer 39 of the communication terminal 3. Furthermore, information such as the radius or the square measure of the predetermined region E may be set by the regional information sender 40 or regional information generator (regional information converter) 16e and then transmitted together with the positional information using the forward link signal.

Based on the predetermined region, that is, predetermined region E, determined beforehand in this manner, the determination processor 38 in the third embodiment, similarly to the second embodiment, generates local terminal region internal-external information that indicates whether the position of the local terminal is within the predetermined region (within the predetermined region E) or is outside the predetermined region; and the generated local terminal region internal-external information is supplied to the combination setter 36.

When the local terminal region internal-external information acquired by the combination setter 36 from the determination processor 38 indicates that the position of the local terminal is within the predetermined region, i.e. within the predetermined region E, then the combination setter 36 sends to the combination selector 35 table information for which the possibility of selection by the combination selector 35 of the time slot for transmitting transmission data from a relatively early time slot channel is higher than for the case in which the position of the local terminal is outside the predetermined region.

On the other hand, when the local terminal region internal-external information shows that the position of the local terminal is outside the predetermined region, i.e. outside the predetermined region E, then the combination setter 36 sends to the combination selector 35 table information for which the possibility of selection by the combination selector 35 of the time slot for transmitting transmission data from a relatively late time slot channel is higher than for the case in which the position of the local terminal is within the predetermined region. By this means, because the probability of early communication is lowered for a communication terminal 3 for which the position of the local terminal is outside the predetermined region, i.e. outside of the predetermined region E, the possibility of early communication by a communication terminal 3 is increased when the position of the local terminal is within the predetermined region, i.e. predetermined region E.

In this manner, because the communication terminal 3 of the third embodiment execute the aforementioned processing, for the communication terminal 3 of the third embodiment, the selection range of the time slots for transmitting the return link signal is changed among each of the plurality of communication terminals 3, depending on whether or not the position of the local terminal is within the predetermined region, i.e. predetermined region E. Moreover, the predetermined region E or a "region set based on predetermined conditions from positional information of a single point indicated by the positional information transmitted as positional information using the forward link signal" is a "region set based on predetermined conditions from positional information of two or more points indicated by the positional information transmitted as positional information using the forward link signal".

A communication method, communication terminal 3, base station 2, and communication system 100 are explained above in the aforementioned second and third embodiments for the case of the communication terminal 3 either being inside or outside of the predetermined region, i.e. predetermined region E. When the position of the communication terminal 3 is within the predetermined region, the range of possible selection of the time slot may be changed by dividing the predetermined region E into a predetermined region E1 and a predetermined region E2. By this means, it is possible to set the selectable range of the time slot more finely, for example, depending on magnitude of the damage in the disaster-stricken area.

The determination processor 38 generates the local terminal region internal-external information indicating whether the position of the local terminal is within the predetermined region E1 or within the predetermined region E2, and this local terminal region internal-external information is supplied to the combination setter 36. When the local terminal region internal-external information acquired from the determination processor 38 shows that the position of the local terminal is within the predetermined region E1, the combination setter 36 sends to the combination selector 35 information of the table in that the possibility of selecting a relatively early time slot channel is increased as the time slot for transmitting the transmission data, relative to when the position of the local terminal is in the predetermined region E2. Furthermore, due to division of the predetermined region E into the predetermined region E1 and predetermined region E2, with respect to the random selection of the time slot channel, the relationship between the predetermined region E1 and predetermined region E2 and the relationship between the predetermined region E1 and the region outside the predetermined region E2 are the same as the relationship between the predetermined region E and the region external to the predetermined region E.

The method of setting the predetermined region E 1 and predetermined region E2 is explained below in reference to FIGS. 15A to 15C. The predetermined region E1 and predetermined region E2 are "regions set based on predetermined conditions from positional information of two or more points indicated by the positional information transmitted using the forward link signal". FIG. 15A is an example showing a predetermined region E1 of circular shape and having a plurality of points (3 points) positioned on a circumference of a circle, and further showing a predetermined region E2 formed by removing the predetermined region E1 from a circular region enclosing this predetermined region E1, the enclosing circle also being formed from a plurality of points (3 points) positioned on the perimeter.

FIG. 15B is an example showing a predetermined region E2 formed from a predetermined region formed by a plurality of points, by removing a predetermined region E1 of square shape, formed by the vertices (4 points), enclosed within this predetermined region E2; and further showing the square shaped region E1 enclosed within this predetermined region E2.

FIG. 15C is an example in which, within a predetermined region composed of a plurality of circles centered on single points (geometric centers), a single circle forms the predetermined region E1, and the remaining circles form the predetermined region E2.

Furthermore, information such as radiuses and square measures of the predetermined region E1 and predetermined region E2 may be predetermined beforehand and may be stored in the determination processor 38 or broadcast information acquirer 39 of the communication terminal 3. Information such as radiuses and square measures of the predetermined region E1 and predetermined region E2 may be set by the regional information sender 40 or the regional information generator (regional information converter) 16e, and this information may be transmitted together with positional information using the forward link signal.

Furthermore, as explained for FIGS. 13C, 13D and 15A, a circular region can be defined when 3 points, i.e. coordinates indicating latitude and longitude, can be acquired. The coordinates (a, b) of the center of the circle and the radius r of the circle are determined easily by substituting x and y coordinates, such as (X1,Y1), (X2,Y2) and (X3,Y3), into the below indicated Equation 1 or Equation 2 for a circle, and simultaneously solving the resultant equations.

$$(x-a)^2+(y-b)^2=r^2 \qquad \text{[Equation 1]}$$

$$x^2+y^2+fx+gy+h=0, \qquad \text{[Equation 2]}$$

where $f=-2a$, $-2b$, and $h=a^2+b^2-r^2$

As described above, the communication terminal 3 according to the third embodiment receives the forward link signal transmitted from the base station 2 according to the third embodiment, and as the predetermined region (predetermined region E), the communication terminal 3 uses the region set based on the predetermined conditions from the positional data of one point indicated by the regional information acquired from the forward link signal. Alternatively, the communication terminal 3 according to the third embodiment receives the forward link signal transmitted from the base station 2 according to the third embodiment, and as the predetermined region (predetermined region E), the communication terminal 3 uses the region set based on the predetermined conditions from the positional data of two or more points indicated by the regional information acquired from the forward link signal.

By use of this method of designating the predetermined region in this manner, it becomes possible to designate a detailed range corresponding to shape of the region to be designated. Here, the expression "region to be designated" means a region such as the surroundings of a position where a disaster is thought to have actually occurred, or a region in which a plurality of users, who suffer the disaster, of the communication terminal 3 are thought to want to transmit short messages.

Fourth Embodiment

The fourth embodiment of the present disclosure is described in reference to FIGS. 16 to 19D. According to the first embodiment through third embodiment, the combination selector 35 is described as randomly determining the 3 channels, i.e. the "spreading code channel", "frequency channel" and "time slot channel", by selecting the aforementioned selection number from a table, stored in the combination setter (table storage) 36, composed of the "spreading code channel", "frequency channel", "time slot channel" and a selection number designated for the combination. However, the fourth embodiment is described as using a separate table dedicated for just the "time slot channel". Furthermore, in the fourth embodiment, parts that are the same as those of the first embodiment through third embodiment are assigned the same reference signs.

Figure 16:
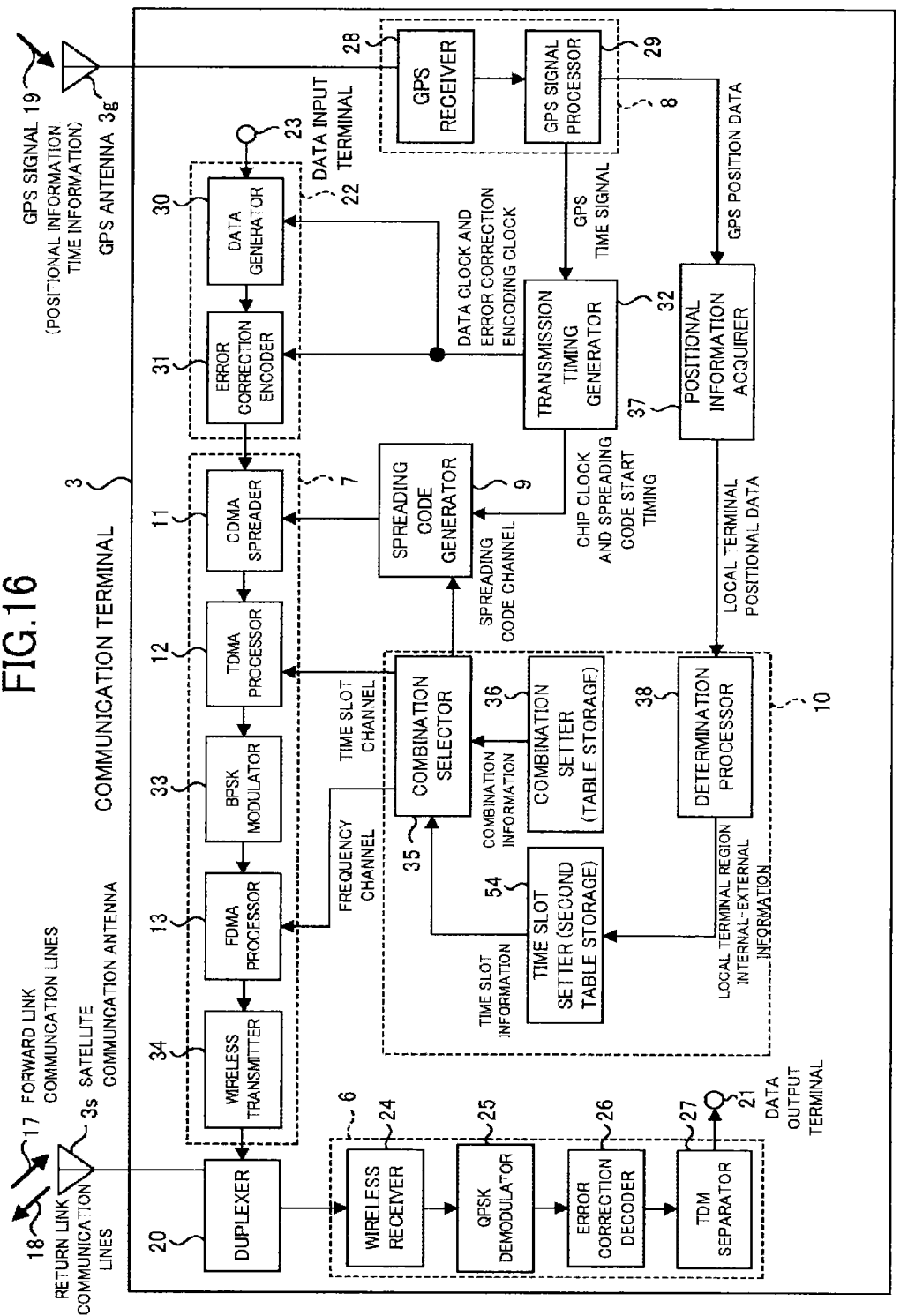
FIG. 16 is a block diagram explaining functions of a communication terminal according to a fourth embodiment of the present disclosure.

As shown in FIG. 16, the time slot setting (second table storage) 54 sets (stores in memory) a table to make possible random selection of the "time slot channel" by the combination selector 35. Thus the combination setter (table storage) 36 according to the fourth embodiment sets (stores in memory) a table to make possible random selection of the "spreading code channel" and the "frequency channel". Moreover, according to the fourth embodiment, the local terminal positional data, i.e. positional information of the local terminal, supplied from the positional information acquirer 37, is supplied to the time slot setter (second table storage) 54 of the random selector 10.

Figure 17:
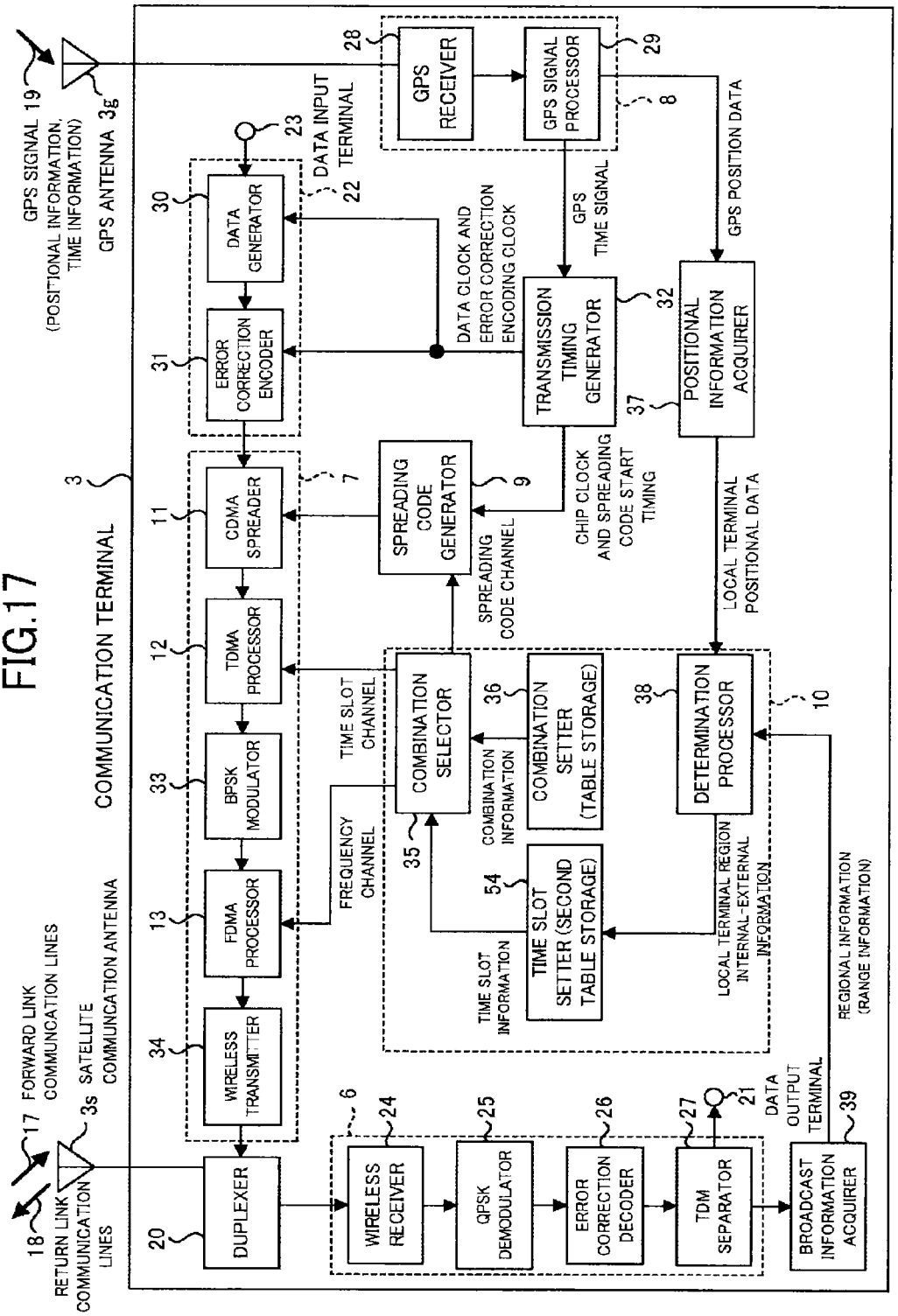
FIG. 17 is a block diagram explaining functions of a communication terminal according to a modified example of the fourth embodiment of the present disclosure.

As shown in FIG. 16, a time slot setter (second table storage) 54 is added to the communication terminal 3 of the second embodiment to obtain the communication terminal 3 of the fourth embodiment. Moreover, as shown in FIG. 17, a time slot setter (second table storage) 54 may be added to the communication terminal 3 of the third embodiment to obtain the communication terminal 3 of the fourth embodiment.

The tables shown in FIGS. 18A to 19D store combinations, which are selected randomly by the combination selector 35, of three channels, i.e. "spreading code channels", "frequency channels" and "time slot channels" without duplication. Moreover, a selection number is assigned to each of the combinations. The values NNN, MMM, LLL and KKK, such as in the final row of the table, are all positive integers and may be different from one another. Furthermore, the time slot channel entrees channel #1, channel #2, . . . , channel #KKK are sorted in order so that earlier entrees are listed earlier.

The tables shown in FIGS. 18A and 19A are tables of combinations of 2 channels, i.e. the "spreading code channel" and "frequency channel", stored in the combination setter (table storage) 36. The tables shown in FIGS. 18B and 19B are tables of the "time slot channel" stored in the time slot setter (second table storage) 54. FIG. 18C shows a table that contains only the relatively early time slot channels, i.e. channel #1 and channel #2, from the table of "time slot channel" shown in FIG. 18B or FIG. 19B. FIG. 18D shows a table that contains only the relatively late time slot channels, i.e. channel #3 and channel #4, from the table of "time slot channel" shown in FIG. 18B or FIG. 19B. FIG. 19C is a table obtained by, without duplication of "time slot channel" number, extracting selectable "time slot channel" elements of the table shown in FIG. 18C. FIG. 19D is a table obtained by extracting selectable "time slot channel" elements of the table shown in FIG. 18D without duplication. In this manner, the count of selection numbers and the count of time slot channels in the tables shown in FIGS. 19C and 19D are the same.

Thus the spreading code channel selection step and the frequency channel selection step of the fourth embodiment select randomly combinations of the spreading code channel and the frequency channel using the tables shown in FIGS. 18A to 19D.

As shown in FIG. 16, the positional information acquirer 37 acquires GPS positional information from the GPS signal processor 29 and outputs the positional information of the local terminal to the determination processor 38. The determination processor 38 generates the local terminal region internal-external information, i.e. information indicating whether or not the position of the local terminal is inside the predetermined region, and supplies the generated local terminal region internal-external information to the time slot setter 54.

When the local terminal region internal-external information acquired from the determination processor 38 indicates that the position of the local terminal is within the predetermined region, then the time slot setter 54 transmits to the combination selector 35 information (combination information) of a table that can increase the possibility that the combination selector 35 selects a time slot for transmitting transmission data from among relatively early time slot channels. The information of a table that enables to select a time slot from among relatively early time slot channels, for example, is the table shown in FIG. 18C.

On the other hand, when the local terminal region internal-external information acquired from the determination processor 38 indicates that the position of the local terminal is outside the predetermined region, then the time slot setter 54 may send to the combination selector 35 information of the table used in usual cases. An example of the information of the table used in usual cases is the table shown in FIG. 18B.

Moreover, when the local terminal region internal-external information indicates that the position of the local terminal is outside the predetermined region, then the time slot setter 54 transmits to the combination selector 35 information of a table that enable to increase the possibility that the combination selector 35 selects a time slot for transmitting transmission data from among relatively late time slot channels, in comparison to the case of the local terminal being located within the predetermined region. An example of the information of the table increasing the possibility of selecting a relatively late time slot channel for the time slot of transmission of the transmission data is the table shown in FIG. 19D. By this means, because of the lowering of the possibility of early transmission by communication terminals 3 for which the local terminal position is outside of the predetermined region, the possibility of early communication by a communication terminal 3 for which the local terminal position is within the predetermined region is increased.

The combination setter 36 sends to the combination selector 35 information, i.e. combination information, of the table containing the combinations of "spreading code channel" and "frequency channel". An example of the information of the table sent to the combination selector 35 is the table shown in FIG. 19A.

The time slot setter 54 acquiring the local terminal region internal-external information from the determination processor 38 supplies to the combination selector 35 information, i.e. combination information, of the aforementioned table based on the local terminal region internal-external information. The combination selector 35 selects randomly the time slot channel from among the information of the acquired table. Then the combination selector 35 supplies the selected time slot channel to the TDM processor 12. Moreover, the combination selector 35 selects randomly a combination of spreading code channel and frequency channel from among the information of the table acquired from the combination setter 36, regardless of the contents of the local terminal region internal-external information. Then the combination selector 35 sends to the spreading code generator 9 the selected spreading code channel, and sends to the FDM processor 13 the selected frequency channel.

Furthermore, regional information indicating a predetermined region possessed beforehand by the determination processor 38 means information indicating a region that requires early communication highly when the communication terminal 3 is within a predetermined region in comparison to when the communication terminal 3 is outside the predetermined region. The communication terminal 3 shown in FIG. 16 is explained for a case in which the predetermined regional information is previously possessed by the combination setter 36, although the communication terminal 3 shown in FIG. 17 is explained for a case in which the predetermined regional information is acquired from the outside. Furthermore, the broadcast information acquirer 39 and the linkage between the broadcast information 39 and the determination processor 38 shown in FIG. 17 are the same as those of the third embodiment, and thus repeated description is omitted.

The table shown in FIGS. 19A to 19D are explained next. The table shown in FIGS. 19A to 19D is a substitute for the table shown in FIGS. 18A to 18D. The table shown in FIG. 19A is possessed by the combination setter 36 and is identical to the table of FIG. 18A. Moreover, the table, possessed by the time slot setter 54, shown in FIG. 19B is identical to the table of FIG. 18B.

In the same manner as in FIGS. 18A and 18B, the combination selector 35 is configured to select randomly from among the "NNN" combinations of the selection numbers "001" through "NNN" of FIGS. 18C and 18D. However, when the selectable time slots are limited depending on the contents of the local terminal region internal-external information generated by the determination processor 38 in order to increase the probability to select the time slot of a relatively early time slot, or to be able to select the time slot of a relatively late time slot, the limited time slots are recorded without duplication in the table, and the count of selection numbers and the count of limited count of time slots are the same. These measures cause no problem.

Thus in the tables shown in FIGS. 19C and 19D, the count of the selectable time slot numbers and the count of the selection numbers are the same. Although there are 2 selection numbers, i.e. "001" and "002" because there are 2 selectable time slot channels, i.e. "channel #1" and "channel #2", this example is not limiting.

In the fourth embodiment, the time slot setter (second table storage) 54 is newly arranged as a means for causing revision of the tables referenced for selecting the time slot channel by the combination selector 35 depending on position of the communication terminal 3. By this means, setting of the "time slot channel" is possible with a higher degree of freedom than when using a single table combining the three channels, i.e. the "spreading code channel", "frequency channel" and "time slot channel". Of course, the production itself of the table of the "spreading code channel", "frequency channel" and "time slot channel" becomes easy.

Fifth Embodiment

The fifth embodiment of the present disclosure is explained in reference to FIGS. 20 to 22C. The communication terminal 3 of the fifth embodiment differs from the communication terminal 3 of the other embodiments in that the time slot channel is selected randomly in accordance with a probability distribution characteristic. Thus even if the communication terminal 3 of the fifth embodiment is required to change the selectable time slot channel depending on the position of the local terminal, there is no need for the random selector 10, for example, to possess a table as shown in FIGS. 7A to 7C, and there is no need to change the referencing table depending on the position of the local terminal. Furthermore, the operation of selecting the spreading code channel and the frequency channel by the communication terminal 3 of the fifth embodiment is basically the same as that of the communication terminals 3 of the first through fourth embodiments. That is to say, the spreading code channel and the frequency channel are selected randomly by the combination selector 35.

The random selector 10 of the communication terminal 3 of the fifth embodiment includes the combination selector 35, combination setter (table storage) 36, determination processor 38, probability distribution storage 55 and probability setter 56. Based on the local terminal region internal-external information acquired from the determination processor 38, the probability setter 56 sends probability distribution selection information to the probability distribution storage 55. Moreover, the probability distribution storage 55 supplies to the combination selector 35 information of probability distribution characteristic such as that shown in FIGS. 22A to 22C.

Figure 20:
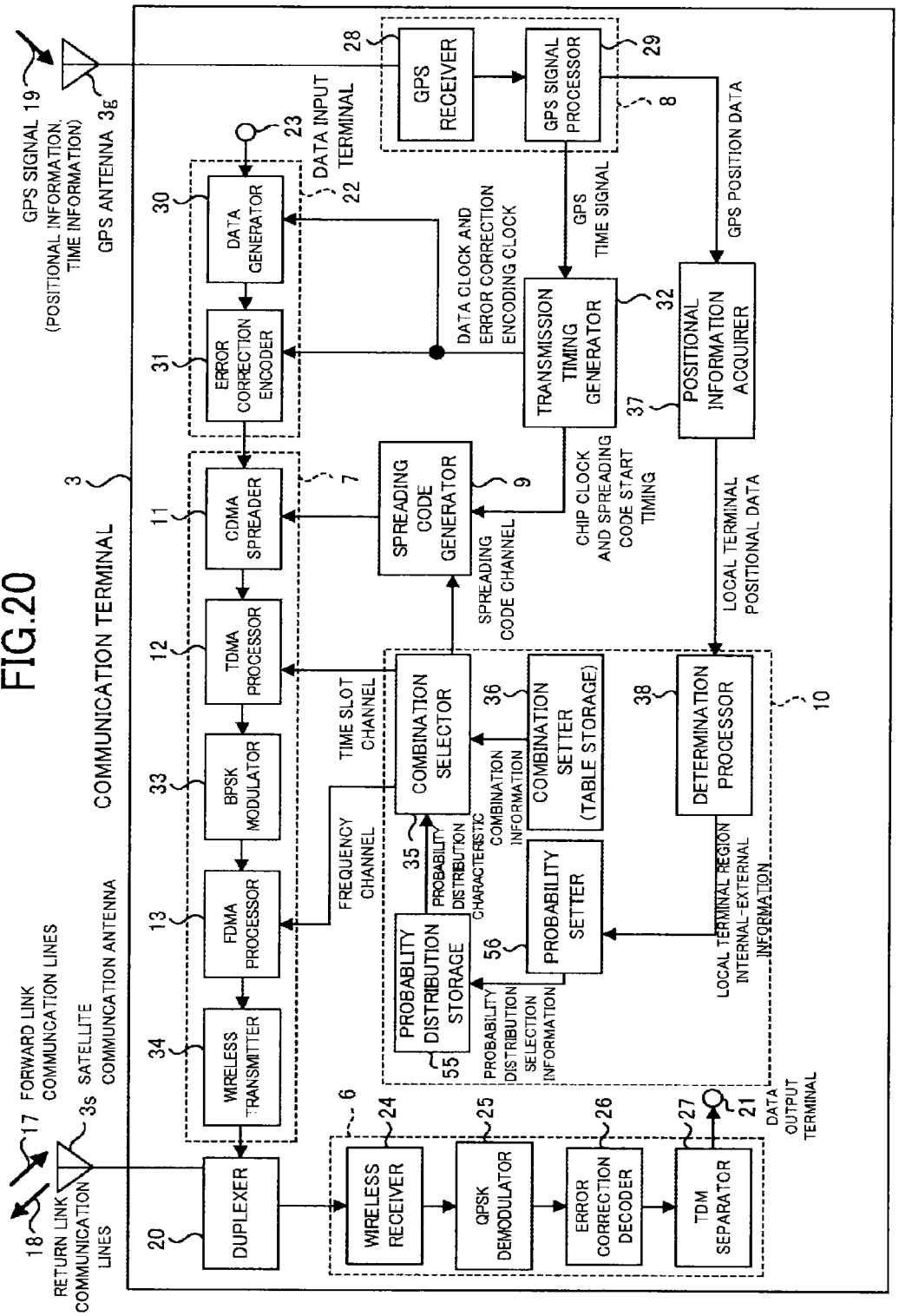
FIG. 20 is a block diagram explaining functions of the communication terminal according to a fifth embodiment of the present disclosure.

The communication terminal 3 shown in FIG. 20 corresponds to the communication terminal 3 of the second embodiment in that the determination of whether the position of the local terminal is within the predetermined region is made by only the communication terminal 3 itself, i.e. just the local terminal. The communication terminal 3 shown in FIG. 21 corresponds to the communication terminal 3 of the third embodiment in that the determination of whether the position of the local terminal is within the predetermined region is made by the communication terminal 3 acquiring information from the base station 2. FIGS. 22A to 22C show characteristic charts of probability distributions with respect to time slot channel, which are stored in the probability distribution storage 55. The characteristic of FIG. 22A is that of a distribution of increasing probability as the time slot channel becomes relatively early. The characteristic of FIG. 22B is that of a distribution in which probability is the same regardless of whether the time slot channel is early or late. The characteristic of FIG. 22C is that of a distribution of increasing probability as the time slot channel becomes relatively late.

In the aforementioned manner, the present disclosure is unable to be applied a slot selection method such as a random access method based on the conventional slotted-ALOHA method, in which the transmission timing of the transmission data is synchronized with slots on the time axis and the transmission is started using a predetermined slot interval. The method of selecting different slots is described below for the random access method using CDMA/FDMA/TDMA that enables transmitting distress messages, i.e. short messages, in unison by the communication terminals 3.

The slots for transmitting data, for example, are selected in the following manner. From among a plurality of time slots in the time period until a time T has passed after generation of a transmission request, each communication terminal selects randomly a single slot. Each communication terminal 3 synchronizes the timing of the slot with the chip clock and spreading code start timing, generated by the transmission timing generator 32 using the absolute time acquired from the GPS time signal and thus slots are synchronized among each of the communication terminals 3.

Here, the data burst length of the short message is assumed to be 125 information bits. A message can be composed of a short number of bits in this manner because the minimum information required for a short message is the ID and positional information of the disaster sufferer, i.e. the user holding the communication terminal 3. Thus the length of time of a single burst becomes 125 bits/50 bps=2.5 seconds. If T is assumed to be 30 minutes, then the number of slots becomes 720.

Next, the "probability $P_s$ of successful transmission of a message by random selection of a single combination of spreading code channel, frequency channel and slot channel by the communication terminal 3 that is one terminal among N, which is the number of accessing communication terminals, communication terminals 3" is determined for the random access method using CDMA/FDMA/TDMA.

The aforementioned probability $P_s$ is equivalent to "when the number of communication terminals 3 overall is N (where N is a positive integer), when a certain single communication terminal 3 selects randomly a single combination of spreading code channel, frequency channel and slot channel, the probability that the other N−1 communication terminals 3 do not select the same combination as that of the aforementioned certain signal communication terminal 3". This probability is equivalent to the case in which k=0 for a binomial distribution for the "probability that the number of successes is k times when performing N independent trials", and thus assuming the binomial distribution to follow the Poisson distribution if n is large, this probability becomes equivalent to that of the case where k=0 for the Poisson distribution. That is to say, if N is the count of communication terminals, $N_c$ is the count of spreading code channels, $N_f$ is the count of frequency channels, and $N_t$ is the count of slot channels, then the average value λ is expressed by the below listed Equation 3.

$$\lambda = \frac{N}{N_c \times N_f \times N_t} \qquad \text{[Equation 3]}$$

Therefore the probability of sending the transmission message $P_s$ is expressed by the below listed Equation 4.

$$P_s = \exp(-\lambda) \quad \text{[Equation 4]}$$

Here, if the assumptions are made that $N_c$=1,024, $N_f$=25, $N_t$=720, and the count of simultaneously accessing communication terminals is 1 million, then substitution into the above equations results in $\lambda$=0.1356 and $P_s$=0.947. Roughly 95% of the communication terminals 3 have no collision of the transmitted short message so that transmission is successful in a single attempt.

A case is next considered of a time-out having occurred at a communication terminal 3. In this case, the communication terminal 3 transmits a short message and then waits for a time period taking into account the round-trip delay time of the satellite channel, i.e. about 0.5 seconds, and processing time of the base station 2. The communication terminal 3 not receiving an ACK signal from the base station 2 transmits a short message again using a slot immediate after elapsing the time period. First and second retransmissions are considered below. If the probability of message collision is represented by $P_c$, the probability of message collision $P_c$ is expressed by the below Equation 5.

$$P_c = 1 - P_s = 1 - \exp(-\lambda) \approx \lambda \quad \text{[Equation 5]}$$

This results in the below listed Equation 6.

$$P_c \approx \frac{N}{N_c \times N_f \times N_t} \quad \text{[Equation 6]}$$

However, in the case considering the first and second retransmissions, the increase of the count N of simultaneously accessing communication terminals 3, i.e. the count of total traffic, is required to be considered. That is to say, the total traffic count used for transmitting the first message by N communication terminals 3 increases to $N/(1-P_c)$ due to collisions during the first message transmission. Moreover, in the case of the first retransmission, the total traffic count further increases to $N/[(1-P_c)(1-P_c^2)]$. In the case of second retransmission, the total traffic count further increases to $N/[(1-P_c)(1-P_c^2)(1-P_c^3)]$. Thus the below listed Equation 7 is established for the case of first and second retransmission.

$$P_c \approx \frac{N/[(1-P_c)(1-P_c^2)(1-P_c^3)]}{N_c \times N_f \times N_t} \quad \text{[Equation 7]}$$

Furthermore, Equation 7 may be rewritten to become the below listed Equation 8.

$$\lambda \approx \frac{N}{N_c \times N_f \times N_t} = P_c(1-P_c)(1-P_c^2)(1-P_c^3) \quad \text{[Equation 8]}$$

In the case considering first and second retransmissions, this is the formula for determining $\lambda = N/(N_c \times N_f \times N_t)$ necessary for obtaining a probability $P_c$ of collision at the first message transmission. If $P_c$ is assumed, for example, to be equal to 0.2, then according to Equation 8, $\lambda$=0.152. Thus if X is assumed to be 0.152, the probability of collision of messages even after second retransmission of the message by a single communication terminal 3, becomes $P_c^3$, and $P_c^3$=0.2$^3$=0.008. Thus transmission of messages by the communication terminal 3 by random access is possible at a message failure rate of 0.8%.

When the aforementioned specific parameters ($N_c$=1,024, $N_f$=25, $N_t$=720) are substituted into the aforementioned equations, then the count of communications terminals, which can access simultaneously, becomes N=0.152×(1,024×25×720)=2,801,664, and approximately 2.80 million communication terminals 3 can access simultaneously at a message failure rate of 0.8%.

Next, a specific method for random selection of the combination of a single spreading code channel, single frequency channel and single time slot channel by the random selector 10 of the communication terminal 3 is indicated. Firstly, a uniform random number $R_{nd}$ is generated between 0 and 1. Assuming that the total number of spreading code channels is $N_c$, $[N_c \times R_{nd}1]$ is calculated, and the integer part of the calculated result is used as the randomly selected first spreading code channel. The frequency channel and time slot channel are selected in the same manner.

Based on the local terminal region internal-external information obtained from the determination processor 38, the probability setter 56 sends to the combination selector 35, through the probability distribution storage 55, the probability distribution selection information indicating the probability distribution to increase the probability of selecting a relatively early time slot channel when the position of the local terminal is within the predetermined region. At this time, the combination selector 35 can use a method such as the inverse transform method for generating random numbers for selecting the time slot channel. The inverse transform method is a generally known method for obtaining random numbers having a desired probability distribution by further transforming random numbers obtained by another method, such as the aforementioned uniform random numbers Rnd. Here, when the probability variable is such variable whose probability taking its value is obtained as a result of a trial, the probability distribution means the distribution indicating relationship between a value of the probability variable and the probability of obtaining the value.

As an example of a probability distribution that increases the probability of selecting a relatively early time slot channel, a probability distribution may be used, for example, that has the same probability for slot channels in the relatively early half of all the time slot channels, and has a probability of zero in the remaining late half of all the time slot channels. In this case, the time slot channel is randomly selected only from among the relatively early time slot channels of the early half of all the time slot channels.

Next, using the tables indicated in FIGS. 7A to 7C, the points of difference and similarity between the fifth embodiment and the first through fourth embodiments are explained concerning the method that the combination selector 35 selects randomly 1 or 2 or more combinations of access methods of the spreading code channel, frequency channel and time slot channel. In the table of FIG. 7A, all combinations of the access methods of the spreading code channel, frequency channel and time slot channel are recorded, and a selection number is assigned to each combination. Moreover, in the table of FIG. 7B, the recorded spreading code channel and frequency channel are the same as in FIG. 7A, although only the relatively early time slot channels are recorded, i.e. channel #1 and channel #2, and the relatively late channels, i.e. channel #3 and channel #4 are not recorded. In the table of FIG. 7C, the recorded spreading code channel and frequency channel are the same as in FIG. 7A, although only the relatively late time slot channels are recorded, i.e. channel #3 and channel #4, and the relatively early channels, i.e. channel #1 and channel #2 are not recorded.

When using the communication terminal 3 of the first through fourth embodiments, the combination selector 35 references the table information, i.e. combination information, acquired from the table storage 36, and by random selection from among such information, the combination selector 35 selects randomly a combination of access methods. By selecting the selection number, random selection is possible for each of the channels. Then when there is a need to provide a time difference in the time slot of transmission depending on the individual communication terminal 3, the combination setter 36 may provide to the combination selector 35 information of a predetermined table, i.e. combination information, such as shown in FIGS. 7B and 7C. That is to say, in the random selection method of the combination of access methods using the aforementioned FIGS. 7B and 7C information in the reference table, i.e. combination information, is changed and thus the combination selector 35 does not determine directly the earliness or lateness of the time slot. In contrast, the fifth embodiment differs with respect to the method of setting heightened selection probability for relatively early time slot channels based on the local terminal region internal-external information in the probability distribution storage 55 and the probability setter 56, or the method of setting heightened selection probability for relatively late time slot channels based on the local terminal region internal-external information in the probability distribution storage 55 and the probability setter 56. Thus the method of selecting the time slot channel of the communication terminals 3 of the first through fourth embodiments selects randomly by referencing table information, i.e. combination information. On the other hand, the method of selecting time slot channel the communication terminal of the fifth embodiment uses the probability distribution characteristic to set a limit to the range of the selectable time slots, and performs random selection within the resultant limited range. The method of selecting the spreading code channel and the frequency channel is the same for the first through fourth embodiments as well as the fifth embodiment, i.e. in each embodiment, selection is made randomly by referencing table information (combination information).

Figure 21:
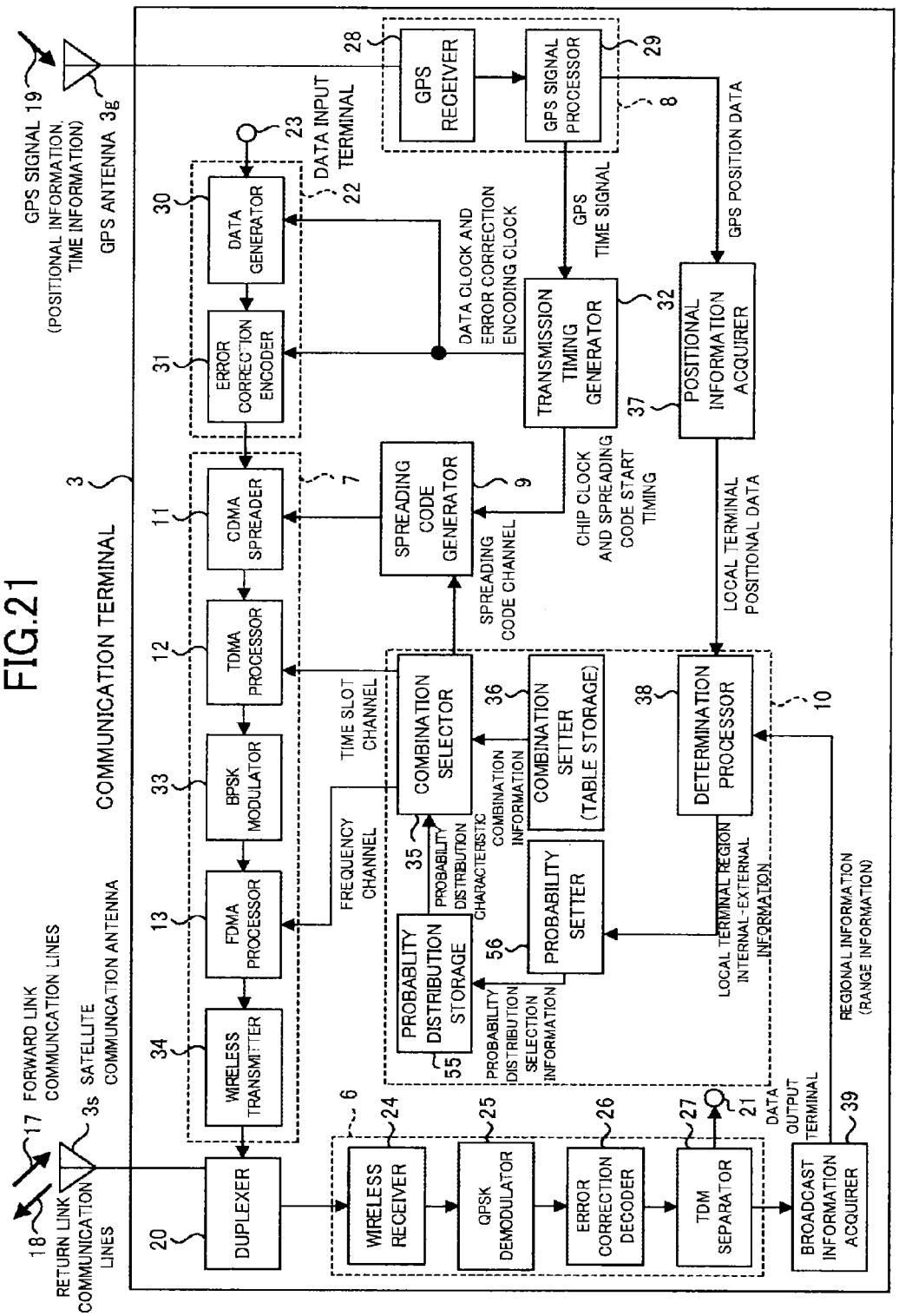
FIG. 21 is a block diagram explaining functions of a communication terminal according to a modified example of the fifth embodiment of the present disclosure.

According to the communication terminal 3 of the fifth embodiment, i.e. the communication terminal 3 shown in FIG. 20 or 21, the table storage (combination setter) 36 supplies to the combination selector 35 the table information, i.e. combination information, shown in Table 7A. The combination selector 35 selects randomly the time slot from among the table information, i.e. combination information, based on the probability distribution characteristic information (shown in FIGS. 22A to 22C) sent from the probability distribution storage 55. In this manner, the communication terminal 3 of the fifth embodiment is able to obtain similar functionality as that of the communication terminals 3 of the first through fourth embodiments, which reference the tables shown in FIGS. 7B and 7C at selection of the combination of access methods. On the other hand, the communication terminal 3 of the fifth embodiment has a high degree of freedom to change the range of time slot channel to be selected randomly, in comparison to the other embodiments that changes the tables of FIGS. 7A to 7C. The reason for the higher degree of freedom is that the slope of the straight line of the probability distribution shown in FIGS. 22A to 22C is changed easily by calculation. Thus according to the fifth embodiment, there is no need to prepare tables other than the basic table, although such preparation is required for the combination setter 36 of the first through fourth embodiments, and thus the amount of memory of the communication terminal 3 of the fifth embodiment can be decreased largely. Of course, the communication terminal 3 of the fifth embodiment can select randomly the time slot channel in the predetermined region E1 and predetermined region E2 that are explained above with respect to the third embodiment.

The probability setter 56 supplies to the probability distribution storage 55 the probability distribution selection information to make possible random selection of a relatively early time slot from among time slot channels within the selectable range, when the local terminal is within the predetermined region according to the local terminal region internal-external information from the determination processor 38. The probability distribution storage 55 selects the characteristic probability distribution characteristic shown in FIG. 22A, and then supplies such information to the combination selector 35. On the other hand, when the local terminal is outside the predetermined region, the probability distribution storage 55 is provided with probability distribution selection information to make possible the random selection of the time slot from among relatively late time slot channels within the selectable range. The probability distribution storage 55 selects the characteristic probability distribution characteristic shown in FIG. 22C, and then supplies such information to the combination selector 35. Furthermore, when the local terminal is outside the predetermined region, the probability distribution storage 55 may be supplied with probability distribution selection information to make possible random selection from among time slot channels within the entire selectable range. In this case, the probability distribution storage 55 selects the probability distribution characteristic of FIG. 22B and supplies the selected information to the combination selector 35.

In the aforementioned manner, the probability distribution storage 55 supplies to the combination selector 35 probability distribution characteristic information from among the probability distribution selection information obtained from the probability setter 56. Thus the combination selector 35, based on the probability distribution characteristic information obtained from the probability setter 56, can change the range of random selection of the channel (time slot channel) from that of the table shown in FIG. 7A. By use of this method, in situations such as when the communication terminal 3, i.e. local terminal, is present within the predetermined region such as a disaster-stricken area, a time slot channel having a relatively early time slot can be preferentially selected for transmitting a short message. This is understood clearly from the probability distribution characteristic shown in FIG. 25. That is to say, the functions of the combination setter (table storage) 36 in the other embodiments, including the function of the time slot setter (second table storage) 54, can be understood to be enhanced in the fifth embodiment by the probability distribution storage 55, probability setter 56 and combination setter (table storage) 36 (the table shown in FIG. A is the only recorded table).

In summary, the communication terminal 3 of the fifth embodiment includes the probability setter 56 and the probability distribution storage 55. Based on the local terminal region internal-external information from the determination processor 38, the probability setter sends the probability distribution selection information to the probability distribution storage 55. Based on the probability distribution selection information from the probability setter 56, the probability distribution storage 55 selects the characteristic of the probability distribution with respect to time slot channel, and sends such information. For example, the characteristic of FIG. 22A is selected by the probability setter 56 when the local terminal is located within the predetermined region, the characteristic of FIG. 22B is selected by the probability setter 56 when it is impossible to determine whether or not the local terminal is located within the predetermined region, and the characteristic of FIG. 22C is selected by the probability setter 56 when the local terminal is not within the predetermined region. Based on the characteristic of the probability distribution received from the probability distribution storage 55, the combination selector 35 selects the time slot channel. For example, when the local terminal is present within the predetermined region, the probability of selecting a relatively early time slot channel can be increased by this means.

When the combination selector 35 selects the time slot based on the probability distribution characteristic using table of FIG. 7A as the basic table, the spreading code channel and frequency channel are determined by selecting the selection number among the selection numbers given to each combination. That is to say, the combination selector 35 selects randomly a single combination of spreading code channel, frequency channel, and time slot channel. Furthermore, the combination selector 35 sends to the spreading code generator 9 the spreading code channel included in the selected selection number, sends the frequency channel to the FDM processor 13, and sends the time slot channel to the TDM processor 12. On the other hand, when Table 18B or 19B is used as the basic table, and when the time slot is selected based on the probability characteristic in the table, the spreading code channel and the frequency channel are separated from the time slot, and thus the spreading code channel and the frequency channel may be selected randomly from FIG. 18A or 19A.

The communication terminal 3 of the fifth embodiment, and particularly the communication terminal 3 shown in FIG. 21, acquires the predetermined regional information from the received forward link signal, and when the local terminal is within the predetermined region, the random selector 10 selects randomly a relatively early time as the time slot for transmitting the transmission data from among the time slot channels within the selectable range in comparison to the case of the local terminal not being located within the predetermined region. On the other hand, when the local terminal is outside the predetermined region, the random selector 10 selects randomly a relatively late time as the time slot for transmitting the transmission data from among the time slot channels within the selectable range in comparison to the case of the local terminal not being located outside the predetermined region.

Sixth Embodiment

Figure 23:
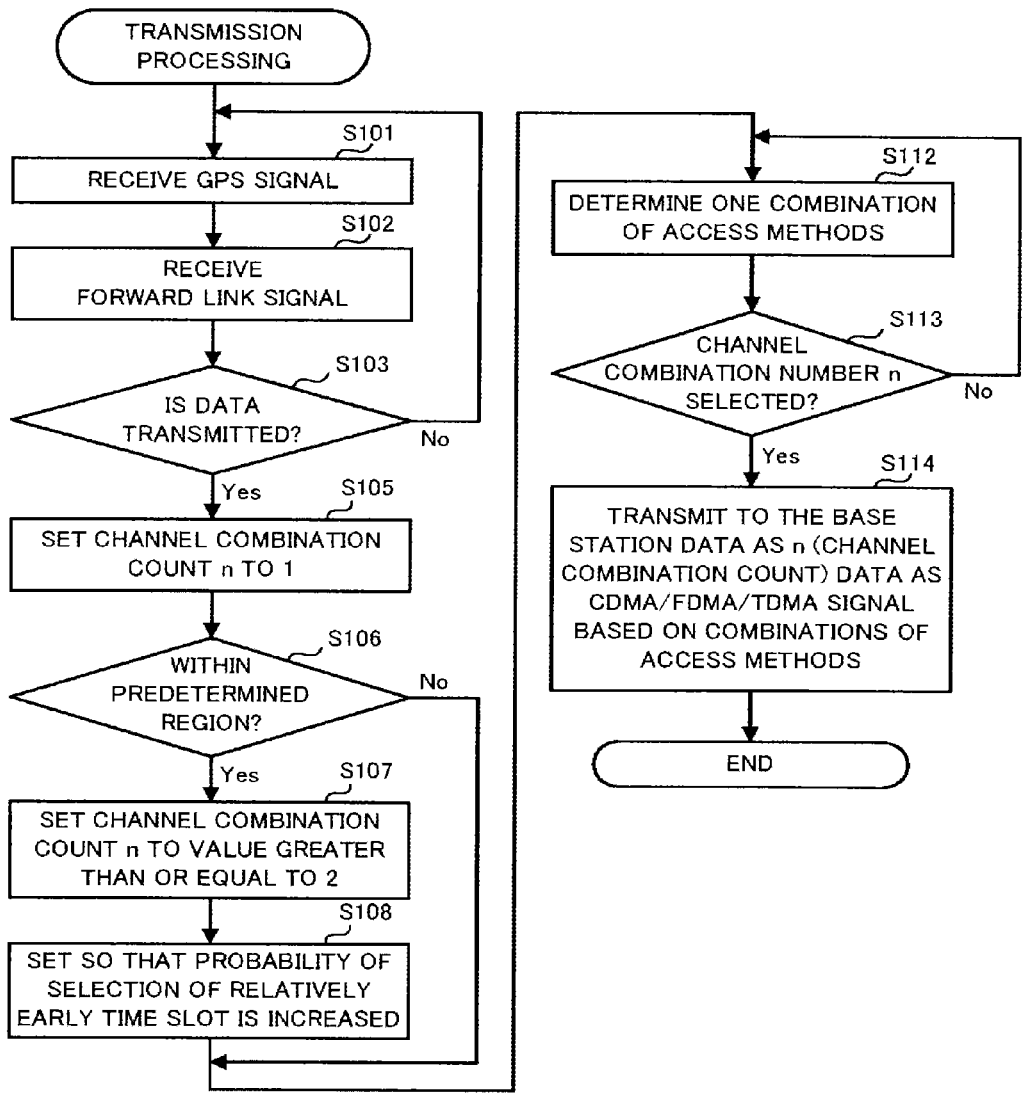
FIG. 23 is a flow chart showing the transmission processing of a communication terminal according to a sixth embodiment of the present disclosure.
Figure 24:
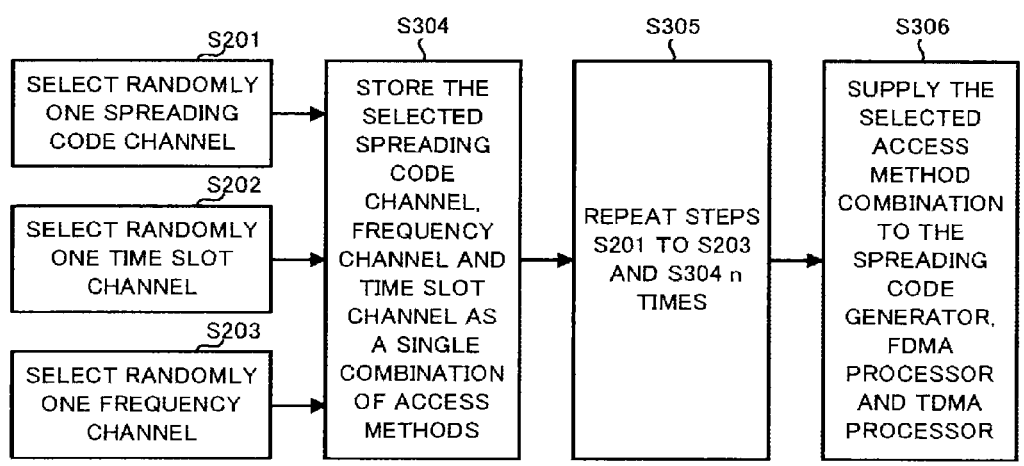
FIG. 24 is a flowchart of processing for selecting the combination of access methods in the transmission processing of the communication terminal according to the sixth embodiment of the present disclosure.

The sixth embodiment of the present disclosure is explained in reference to FIG. 24. The configuration of the communication terminal 3 according to the first through fifth embodiments assumes that the return link signal is transmitted only once except for first or second retransmission. The communication terminal 3 of the sixth embodiment is explained for the case of several transmission of the return link signal at first transmission. The communication method of the sixth embodiment is described using the flowcharts of FIGS. 23 and 24, and the descriptions of the configurations of the communication terminal 3, base station 2 and communication system 100 of the sixth embodiment are omitted.

Although each of the processing steps S101, S102, S103, S109-S112 and S114 of the flowcharts shown in FIGS. 4 and 9 are described above for the communication methods of the first through fifth embodiments, the communication method of the sixth embodiment further adds the processing steps S105, S 107, S108 and S113 as indicated in FIG. 23. Basically, the flowchart shown in FIG. 23 expresses mainly the operation of the random selector 10 of the communication terminal 3.

As shown in FIG. 23, the determination processor 38 sets 1 as an initial value to be used for the value n of the channel combination count indicating the number of combinations of access methods for the spreading code channel, time slot channel and frequency channel (step S105). This means that the local terminal is located outside of the predetermined region, and there is no need to increase the probability of selection to make early communication successful, in comparison to when the local terminal is inside the predetermined region.

Thereafter, the determination processor 38 determines whether the position of the local terminal is within the predetermined region, based on the local terminal positional information from the positional information acquirer 37 and the predetermined regional information given in advance or regional information from the broadcast information acquirer 39 (step S106). When the determination is that the local terminal is located within the predetermined region (result of step S106=YES), then the channel combination count n is set to a value greater than or equal to 2 in order to increase the possibility of success of early communication (step S107). When the random selector 10 uses the table shown in FIG. 7A, and for example, the channel combination count n is 10, then 10 selection numbers and combinations of channels shown in FIG. 7A are selected. Furthermore, the selection of the time slot in step S108 selects the time slot so as to increase the probability of selection from among relatively early time slot channels. On the other hand, steps S107 and S108 are skipped when the determination in step S106 is that the position of the local terminal is outside the predetermined region.

Thereafter, in step S113, determination is made as to whether the number of selected combinations of access methods, that are, spreading code channel, frequency channel and time slot channel is the channel combination count n. If the selected channel combinations have not reached the channel combination count n, then processing returns to step S112, i.e. the processing of step S112 is repeated n times. On the other hand, if determination is made that the selected number of channel combinations is equal to the channel combination count n, then processing proceeds to step S114.

Based on the n combinations of access methods selected by the random selector 10, the transmitter 7 transmits the transmission data to the base station 2 via the satellite 1 as a CDMA/FDMA/TDMA signal (step S114). The transmitter 7 transmits the transmission data n (combination count) times. That is to say, the count of transmissions of the transmitting the CDMA-spread transmission data is n times, using the time slot channel selected in the time slot channel selection step, the frequency corresponding to the frequency channel selected in the frequency channel selection step, and the spreading code channel selected in the spreading code channel selection step.

In this manner, in the sixth embodiment, when the position of the local terminal is within the predetermined region based on the local terminal region internal-external information, the combination setter 36 sends to the combination selector 35 information that sets the channel combination count n to a value greater than or equal to 2. Such operation is used so that, when the local terminal is present within a region such as a disaster-stricken area, the same message can be transmitted a plurality of times using a plurality of channel combinations so as to arrive at the service center 16 reliably. Moreover, if the position of the local terminal is within the predetermined region according to the local terminal region internal-external information, the time slot setter (probability setter 56 in the fifth embodiment) sends to the combination selector 35 setting information that increases the probability of selecting a relatively early time slot. Sending information in this manner is used to increase the possibility that a relatively early time slot is selected when the local terminal is present in a region such as a disaster-stricken area, so that the service center 16 can acquire the short message as early as possible.

FIG. 24 is a chart showing the method of random selection by the random selector 10 of the communication terminal 3 when selecting 1 or a plurality of, i.e. channel communication count n set by the combination setter 36, combinations of spreading code channel, frequency channel and time slot channel. Steps S201, S202 and S203 are the same as those of the flowchart of FIG. 5.

In step S304 shown in FIG. 24, the random selector 10 selects a combination of access methods, that are, spreading code channel, frequency channel and time slot channel and stores the selected information in an unillustrated memory. In step S305, the random selector 10 uses the combination setter 36 to repeat n (channel combination count) times the setting of steps S201-203 and S204. In step S306, the random selector 10 notifies various components of the single or a plurality of combinations of access methods stored in memory. Specifically, the spreading code channel is provided to the spreading code generator 9, the frequency channel is provided to the FDM processor 13, and the time slot channel is provided to the TDM processor 12.

In this manner in the present disclosure, the communication terminal 3 is able to select randomly a spreading code channel, frequency channel and time slot channel combination so that by transmitting transmission data to the base station 2 via the satellite 1 as the CDMA/FDMA/TDMA signal, collisions caused by transmitting data simultaneously by communication terminals 3 are suppressed, and communication efficiency, i.e. throughput, is increased. Moreover, a communication method, communication terminal 3, base station 2 and communication system 100 are obtained that can prevent congestion of the communication lines.

For example, instead of using a table in the aforementioned embodiment, the aforementioned embodiment can be configured to select randomly the time slot channel while limiting the range of selected time slot channel to channel #1 and channel #2.

For example, rather than using the table of FIG. 7B, the random selector 10 in step S110 may select randomly, for example, a time slot channel in the range limited to channel #1 and channel #2. In the same manner, rather than using the table of FIG. 7C, the random selector 10 in step S110 may select randomly, for example, a time slot channel in the range limited to channel #3 and channel #4.

The present disclosure makes various embodiments and modifications possible without departing from the broad spirit and scope of the present disclosure. Moreover, the above mentioned embodiments are for explaining the present disclosure, and do not limit the scope of the present disclosure. That is, the scope of the present disclosure is defined not by the embodiments but by the claims, and various modifications performed within the claims and within the scope of the meaning of the equivalent disclosure are deemed to be within the present disclosure.

This application is based on the Japanese Patent Application 2012-231053 filed on Oct. 18, 2012. The specification, claims and the whole drawings of the Japanese patent application 2012-231053 is herein incorporated by reference into this specification.

INDUSTRIAL APPLICABILITY

The present disclosure can be used with advantage for a wireless communication system, communication terminal, base station and communication method that perform communication between a base station and communication terminal.

REFERENCE SIGNS LIST

1 . . . Satellite,
2 . . . Base station,
2s . . . Satellite communication antenna (base station-side satellite communication antenna),
2t . . . Base station transmitter,
2r . . . Base station receiver,
3 . . . Communication terminal,
3s . . . Satellite communication antenna (communication terminal-side satellite communication antenna),
3g . . . GPS antenna,
4 . . . GPS satellite
6 . . . Receiver,
7 . . . Transmitter,
8 . . . Information acquirer,
9 . . . Spreading code generator,
10 . . . Random selector,
11 . . . CDMA spreader,
12 . . . TDMA processor,
13 . . . FDMA processor,
14 . . . Ground network,
15 . . . Satellite tracking and control center,
16 . . . Service center,
16e . . . Regional information generator (regional information converter),
17 . . . Forward link communication lines,
18 . . . Return link communication lines,
19 . . . GPS signal,
20 . . . Duplexer,
21 . . . Data output terminal,
22 . . . Transmission data processor,
23 . . . Data input terminal,
24 . . . Wireless receiver,
25 . . . QPSK demodulator,
26 . . . Error correction decoder,
27 . . . TDM separator,
28 . . . GPS receiver,
29 . . . GPS signal processor,
30 . . . Data generator,
31 . . . Error correction encoder,
32 . . . Transmission timing generator,
33 . . . BPSK modulator,
34 . . . Wireless transmitter,
35 . . . Combination selector,
36 . . . Combination setter (table storage),
37 . . . Positional information acquirer,
38 . . . Determination processor,
39 . . . Broadcast information acquirer,
40 . . . Regional information sender,
41 . . . Ground interface,
42 . . . Data generator,
43 . . . TMD multiplexer, 44 . . . Control information transmitter,
45 . . . Error correction encoder,
46 . . . QPSK modulator,
47 . . . Wireless transmitter (base station-side transmitter),
48 . . . Duplexer,
49 . . . Wireless receiver (base station-side receiver),
50 . . . CDMA despreader,
51 . . . BPSK demodulator,
52 . . . Error correction decoder,
53 . . . Data processor,
54 . . . Time slot setter (second table storage),
55 . . . Probability distribution storage,
56 . . . Probability setter,
96 . . . Storage,
97 . . . Display,
98 . . . Operation part,
99 . . . Controller,
100 . . . Communication system

The invention claimed is:

1. A communication method for transmitting via a satellite from a communication terminal to a base station code division multiple access (CDMA)-spread transmission data, comprising:
receiving a forward link signal transmitted from the base station via the satellite;
selecting randomly a spreading code channel for CDMA spreading of transmission data generated upon receiving the forward link signal that includes disaster service initiation information;
selecting randomly a time slot channel for transmitting the CDMA-spread transmission data;
selecting randomly a frequency channel for transmitting the CDMA-spread transmission data; and
transmitting to the base station via the satellite as a return link signal the CDMA-spread transmission data in the selected spreading code channel, using the selected time slot channel, at a frequency corresponding to the selected frequency channel; wherein
the selecting randomly the time slot channel comprises:
when the communication terminal is within a predetermined region, increasing a probability of selecting a relatively early time slot channel compared with the communication terminal being outside the predetermined region; and/or
when the communication terminal is outside the predetermined region, decreasing the probability of selecting a relatively early time slot channel compared with the communication terminal being within the predetermined region.

2. A communication method for transmitting via a satellite from a communication terminal to a base station code division multiple access (CDMA)-spread transmission data, comprising:
receiving a forward link signal transmitted from the base station via the satellite;
selecting randomly a spreading code channel for CDMA spreading of transmission data generated upon receiving the forward link signal that includes disaster service initiation information;
selecting randomly a time slot channel for transmitting the CDMA-spread transmission data;
selecting randomly a frequency channel for transmitting the CDMA-spread transmission data; and
transmitting to the base station via the satellite as a return link signal the CDMA-spread transmission data in the selected spreading code channel, using the selected time slot channel, at a frequency corresponding to the selected frequency channel; wherein
the selecting randomly the time slot channel comprises;
when the communication terminal is within a predetermined region, compared with the communication terminal being outside the predetermined region, randomly selecting a relatively early time slot channel, from among time slot channels within a selectable range, and/or
when the communication terminal is outside the predetermined region, compared with the communication terminal being within the predetermined region, randomly selecting a relatively late time slot channel, from among the time slot channels within the selectable range.

3. The communication method according to claim 1, further comprising:
acquiring a position of the communication terminal.

4. The communication method according to claim 1, wherein
the selecting randomly the time slot channel comprises;
selecting the time slot channel according to positional information indicating whether the communication terminal is within the predetermined region or the communication terminal is outside the predetermined region.

5. The communication method according to claim 1, wherein
the forward link signal includes regional information; and
the predetermined region is a region set based on a predetermined condition from among positional information of at least one point indicated by the regional information.

6. The communication method according to claim 1, wherein
the selecting randomly the spreading code channel and the selecting randomly the frequency channel include randomly selecting the spreading code channel and the frequency channel from a predetermined table comprising combinations of the spreading code channel and the frequency channel.

7. The communication method according to claim 1, wherein
the selecting randomly of the spreading code channel, the selecting randomly of the frequency channel and the selecting randomly of the time slot channel include randomly selecting the spreading code channel, the frequency channel and the time slot channel from a predetermined table comprising combinations of the spreading code channel, the frequency channel and the time slot channel.

8. The communication method according to claim 1, further comprising:
transmitting the CDMA-spread transmission data in synchronism with other communication terminals.

9. The communication method according to claim 1, wherein
the spreading code channel is an orthogonal code channel.

10. A communication terminal that transmits code division multiple access (CDMA)-spread transmission data to a base station via a satellite, comprising;
a receiver that receives a forward link signal transmitted from the base station via the satellite;
a CDMA spreader that CDMA spreads transmission data generated upon the receiver receiving the forward link signal that includes disaster service initiation information;

a controller that generates a spreading code to be used by the CDMA spreader for CDMA spreading;

a time division multiple access (TDMA) processor that delays transmission of the transmission data CDMA spread by the CDMA spreader according to a transmitting time slot;

a frequency division multiple access (FDMA) processor that performs a frequency conversion on the transmission data delayed by the TDMA processor;

a transmitter that transmits to the base station via the satellite as a return link signal the transmission data frequency-converted by the FDMA processor; and a global positioning system (GPS) receiver that acquires GPS information, wherein the controller commands random selection of a spreading code channel used by the controller, commands random selection of a time slot channel which is a basis of a time for delaying the transmission of the transmission data by the TDMA processor, and commands random selection of a frequency channel for the frequency conversion of the FDMA processor, and wherein when a position of the communication terminal obtained from positional information including in the GPS information is within a predetermined region, compared with the position being outside the predetermined region, the controller increases a probability of selecting, from relatively early time slot channels, the time slot which is the basis of the time for delaying the transmission of the transmission data by the TDMA processor; and/or when the position is outside the predetermined region, compared with the position being within the predetermined region, the controller decreases the probability of selecting, from the relatively early time slot channels, the time slot which is the basis of the time for delaying the transmission of the transmission data by the TDMA processor.

11. The communication terminal according to claim 10, wherein the controller selects randomly a combination of the spreading code channel, the time slot channel, and the frequency channel from a table that stores a plurality of combinations of the spreading code channel, the time slot channel, and the frequency channel.

12. A communication terminal that transmits code division multiple access (CDMA)-spread transmission data to a base station via a satellite, comprising:

a receiver that receives a forward link signal transmitted from the base station via the satellite;

a CDMA spreader that CDMA spreads transmission data generated upon the receiver receiving the forward link signal that includes disaster service initiation information;

a controller that generates a spreading code to be used by the CDMA spreader for CDMA spreading;

a time division multiple access (TDMA) processor that delays transmission of the transmission data CDMA spread by the CDMA spreader according to a transmitting time slot;

a frequency division multiple access (FDMA) processor that performs a frequency conversion on the transmission data delayed by the TDMA processor;

a transmitter that transmits to the base station via the satellite as a return link signal the transmission data frequency-converted by the FDMA processor; and a global positioning system (GPS) receiver that acquires GPS information, wherein the controller commands random selection of a spreading code channel used by the controller, commands random selection of a time slot channel which is a basis of a time for delaying the transmission of the transmission data by the TDMA processor, and commands random selection of a frequency channel for the frequency conversion of the FDMA processor, and wherein when a position of the communication terminal obtained from-positional information included in the GPS information is within a predetermined region, compared with the position being outside the predetermined region, the controller selects randomly, from relatively early time slot channels within a selectable range, a time slot which is the basis of the time for delaying the transmission of the transmission data by the TDMA processor; and/or when the position is outside the predetermined region, compared with the position being within the predetermined region, the controller randomly selects, from relatively late time slot channels within a selectable range, a time slot which is the basis of the time for delaying the transmission of the transmission data by the TDMA processor.

13. The communication terminal according to claim 10, wherein the controller generates the spreading code using a spreading code start timing generated from time information obtained from the GPS information.

14. A base station that communicates with a plurality of communication terminals via a satellite, comprising:

a base station transmitter that transmits to the plurality of communication terminals a forward link signal including disaster service initiation information, the forward link signal further including regional information set based on predetermined conditions, the disaster service initiation information causing the plurality of communication terminals to transmit a return link signal to the base station, and a base station receiver that receives from the plurality of communication terminals the return link signal code division multiple access (CDMA) which is spread using a spreading code generated based on a spreading code start timing that is generated from time information and that is synchronized among the plurality of communication terminals, the time information being included in global positioning system (GPS) information obtained from the satellite or a GPS satellite, wherein a range of selecting time slot channel for transmitting the return link signal to each of the communication terminals is changed, and the change depends on whether a respective communication terminal is within a predetermined region indicated by the regional information.

15. The base station according to claim 14, wherein the base station transmitter transmits as the regional information positional information of at least one point.

16. A communication system that communicates between a base station and a plurality of communication terminals via a satellite, wherein the base station transmits a forward link signal to the plurality of communication terminals; and each of the plurality of communication terminals comprises:

a receiver that receives the forward link signal;

a transmitter that code division multiple access (CDMA) spreads transmission data generated upon the receiver receiving the forward link signal that includes disaster service initiation information, delaying transmission of the CDMA-spread transmission data according to a transmitting time slot, performing a frequency conversion of the delayed transmission data, and transmitting the frequency-converted transmission data to the base station via the satellite as a return link signal;

a global positioning system (GPS) receiver that acquires GPS information obtained from the satellite or a GPS satellite; and a controller that generates, according to a spreading code start timing synchronized among the plurality of communication terminals, a spreading code generated from time information obtained from the GPS information to be used for CDMA spreading by the transmitter, that commands random selection of a spreading code channel used by the controller, that commands random selection of a time slot channel which is a basis of a time for delaying the transmission of the transmission data by the transmitter, and that commands random selection of a frequency channel for the frequency conversion by the transmitter, wherein the receiver acquires information of a predetermined region from the received forward link signal; and wherein when the communication terminal is within the predetermined region, compared with the communication terminal being outside the predetermined region, the controller increases a probability of selecting, from relatively early time slot channels, a time slot which is the basis of the time for delaying the transmission of the transmission data by the transmitter; and/or when the communication terminal is outside the predetermined region, compared with the communication terminal being within the predetermined region, the controller decreases the probability of selecting, from the relatively early time slot channels, the time slot which is the basis of the time for delaying the transmission of the transmission data by the transmitter.

17. A communication system that communicates between a base station and a plurality of communication terminals via a satellite, wherein the base station transmits a forward link signal to the plurality of communication terminals; and each of the plurality of communication terminals comprises:

a receiver that receives the forward link signal;

a transmitter that code division multiple access (CDMA) spreads transmission data generated upon the receiver receiving the forward link signal that includes disaster service initiation information, delays transmission of the CDMA-spread transmission data according to a transmitting time slot, performs a frequency conversion of the delayed transmission data, and transmits the frequency-converted transmission data to the base station via the satellite as a return link signal;

a global positioning system (GPS) receiver that acquires GPS information obtained from the satellite or a GPS satellite;

a controller that generates, according to a spreading code start timing synchronized among the plurality of communication terminals, a spreading code generated from time information obtained from the GPS information to be used for CDMA spreading by the transmitter, that commands random selection of a spreading code channel used by the controller, that commands random selection of a time slot channel which is used as a basis of a time for delaying the transmission of the transmission data by the transmitter, and that commands random selection of a frequency channel for the frequency conversion by the transmitter, wherein the receiver acquires information of a predetermined region from the received forward link signal; and wherein when the communication terminal is within the predetermined region, compared with the communication terminal being outside the predetermined region, the controller selects randomly, from relatively early time slot channels within a selectable range, a time slot which is the basis of the time for delaying the transmission of the transmission data by the transmitter; and/or when the communication terminal is outside the predetermined region, compared with the communication terminal being within the predetermined region, the controller selects randomly, from relatively late time slot channels within a selectable range, a time slot which is the basis of the time for delaying the transmission of the transmission data by the transmitter.

18. The communication system according to claim 16, wherein the controller determines a position of the communication terminal from positional information obtained from the GPS information.

19. The communication system according to claim 17, wherein the receiver sets a region set based on a predetermined condition from positional information of at least one point indicated by the regional information obtained from the forward link signal, to the predetermined region.

\* \* \* \* \*